US011959394B2

(12) United States Patent
Hirata

(10) Patent No.: US 11,959,394 B2
(45) Date of Patent: Apr. 16, 2024

(54) TURBINE ROTOR BLADE

(71) Applicant: MITSUBISHI HEAVY INDUSTRIES, LTD., Tokyo (JP)

(72) Inventor: Norifumi Hirata, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 63 days.

(21) Appl. No.: 17/789,638

(22) PCT Filed: Jan. 26, 2021

(86) PCT No.: PCT/JP2021/002541

§ 371 (c)(1),
(2) Date: Jun. 28, 2022

(87) PCT Pub. No.: WO2021/153531

PCT Pub. Date: Aug. 5, 2021

(65) Prior Publication Data

US 2023/0037206 A1 Feb. 2, 2023

(30) Foreign Application Priority Data

Jan. 27, 2020 (JP) ................................ 2020-010498

(51) Int. Cl.
*F01D 5/14* (2006.01)

(52) U.S. Cl.
CPC ........ *F01D 5/147* (2013.01); *F05D 2240/305* (2013.01); *F05D 2240/306* (2013.01);
(Continued)

(58) Field of Classification Search
CPC .......... F01D 5/143; F01D 5/141; F01D 5/145; F01D 9/041; F01D 5/147; F01D 5/14;
(Continued)

(56) References Cited

U.S. PATENT DOCUMENTS 6,181,978 B1 1/2001 Hinds et al.
6,969,232 B2 * 11/2005 Zess ..................... F04D 29/681 416/193 A (Continued)

FOREIGN PATENT DOCUMENTS

JP 60-81205 6/1985
JP 61-149504 7/1986

(Continued)

OTHER PUBLICATIONS

Office Action dated Mar. 10, 2020 in corresponding Japanese Patent Application No. 2020-010498, with Machine Translation.

*Primary Examiner* — Eric J Zamora Alvarez
(74) *Attorney, Agent, or Firm* — Wenderoth, Lind & Ponack, L.L.P.

(57) ABSTRACT

A suction side fillet portion of a turbine rotor blade includes a central fillet portion located at the center of a length of the suction side fillet portion along an extension direction of the suction side fillet portion, an upstream intermediate fillet portion which is located between the central fillet portion and a front edge that is an upstream end of the suction side fillet portion, and in which a fillet height from an upper surface of a platform portion is higher than a fillet height of the central fillet portion, and a downstream intermediate fillet portion which is located between the central fillet portion and a rear edge that is a downstream end of the suction side fillet portion, and in which a fillet height from the upper surface of the platform portion is higher than the fillet height of the central fillet portion.

21 Claims, 13 Drawing Sheets

(52) U.S. Cl.
CPC ...... *F05D 2240/80* (2013.01); *F05D 2250/14* (2013.01); *F05D 2260/941* (2013.01)

(58) Field of Classification Search
CPC . F01D 9/02; F01D 17/162; F01D 5/02; F01D 5/3007; F01D 5/30; F05D 2240/80; F05D 2250/71; F05D 2220/32; F05D 2240/12; F05D 2240/304; F05D 2240/303; F05D 2260/941; F05D 2240/121; F05D 2250/70; F05D 2240/122; F05D 2250/14; F05D 2250/711; F05D 2240/301; F05D 2250/712; F05D 2250/713; F05D 2250/232; F05D 2240/306; F05D 2240/30; F05D 2250/16; F05D 2250/184; F05D 2250/17; F05D 2250/20; F05D 2250/90; F05D 2270/17; F05D 2230/50; F05D 2240/124; F05D 2240/305; F04D 29/544; F04D 29/324; F04D 29/547
See application file for complete search history.

(56) References Cited

U.S. PATENT DOCUMENTS

| | | | | |
|---|---|---|---|---|
| 9,581,027 | B2 * | 2/2017 | Romanowski .......... | F01D 5/143 |
| 9,982,548 | B2 * | 5/2018 | Ols .......................... | F01D 9/041 |
| 10,309,241 | B2 * | 6/2019 | Bailey ................... | F04D 29/522 |
| 2004/0081548 | A1 | 4/2004 | Zess et al. | |
| 2006/0275112 | A1 | 12/2006 | Lee et al. | |
| 2007/0031259 | A1 | 2/2007 | Dube et al. | |
| 2016/0123166 | A1 | 5/2016 | Ols et al. | |
| 2019/0338659 | A1 | 11/2019 | Hamabe | |

FOREIGN PATENT DOCUMENTS

| | | |
|---|---|---|
| JP | 61-294101 | 12/1986 |
| JP | 5-44691 | 2/1993 |
| JP | 2004-278517 | 10/2004 |
| JP | 2006-342804 | 12/2006 |
| JP | 2007-40296 | 2/2007 |
| JP | 2010-196625 | 9/2010 |
| JP | 2010-203259 | 9/2010 |
| JP | 2011-74837 | 4/2011 |
| JP | 6126745 | 5/2017 |
| WO | 2018/147162 | 8/2018 |

* cited by examiner

TURBINE ROTOR BLADE

TECHNICAL FIELD

The present disclosure relates to a turbine rotor blade.

BACKGROUND

A typical turbine rotor blade includes an airfoil portion having a pressure surface and a suction surface, a platform portion formed on a base end side of the airfoil portion, a shank portion formed opposite to the airfoil portion across the platform portion, and a suction side fillet portion formed in a connection between the suction surface and an upper surface of the platform portion.

Patent Document 1 discloses that stress concentration occurs at a position in the vicinity of a blade leading edge and a position in the vicinity of a blade trailing edge in the suction side fillet portion of the turbine rotor blade. Further, in the turbine rotor blade described in Patent Document 1, in order to suppress the stress concentration, a fillet width of the suction side fillet portion is larger at the position in the vicinity of the blade leading edge and the position in the vicinity of the blade trailing edge than at another position.

CITATION LIST

Patent Literature

Patent Document 1: JP2010-203259A

SUMMARY

Technical Problem

However, an area of the upper surface of the platform portion is finite, and in particular, the width of the fillet portion that can be formed on the suction side on the upper surface of the platform portion is limited. Thus, for example, in a case where the area of the upper surface of the platform portion cannot sufficiently be secured due to enlargement of the airfoil portion of the turbine rotor blade or the like, the effect of suppressing the stress concentration by increasing the fillet width described in Patent Document 1 is limited.

In view of the above, an object of the present disclosure is to provide the turbine rotor blade capable of suppressing the stress concentration.

Solution to Problem (1) A turbine rotor blade according to the present disclosure includes an airfoil portion having a pressure surface and a suction surface, a platform portion formed on a base end side of the airfoil portion, a shank portion formed opposite to the airfoil portion across the platform portion, and at least a suction side fillet portion of a fillet portion formed in a connection between the suction surface and an upper surface of the platform portion. The suction side fillet portion includes a central fillet portion which is formed at a position including a center of a length of the suction side fillet portion along an extension direction of the suction side fillet portion, an upstream intermediate fillet portion which is located between the central fillet portion and a front edge that is an upstream end of the suction side fillet portion, and in which a fillet height of the fillet portion from the upper surface of the platform portion is higher than the fillet height of the central fillet portion, and a downstream intermediate fillet portion which is located between the central fillet portion and a rear edge that is a downstream end of the suction side fillet portion, and in which a fillet height of the fillet portion from the upper surface of the platform portion is higher than the fillet height of the central fillet portion. A ratio of the fillet height to a fillet width in the upstream intermediate fillet portion is lower than a ratio of the fillet height to a fillet width in the central fillet portion. A ratio of the fillet height to a fillet width in the downstream intermediate fillet portion is lower than the ratio of the fillet height to the fillet width in the central fillet portion.

With the turbine rotor blade defined in the above configuration (1), since, in the suction side fillet portion, the fillet heights in the upstream intermediate fillet portion and the downstream intermediate fillet portion where the stress is likely to be high are higher than the fillet height in the intermediate fillet portion where the stress is relatively low, it is possible to suppress the stress concentration. Thus, it is possible to improve the life of the turbine rotor blade due to bending creep. Further, as compared with the case where the fillet height is uniformly increased from the front edge to the rear edge of the suction side fillet portion, it is possible to suppress the deterioration in aerodynamic performance.

Further, in the upstream intermediate fillet portion and the downstream intermediate fillet portion where it is relatively easy to secure the fillet width on the upper surface of the platform portion, the ratio of the fillet height to the fillet width is lower than in the central fillet portion where it is difficult to secure the fillet width, it is possible to suppress the deterioration in aerodynamic performance while suppressing the stress concentration.

(2) In some embodiments, in the turbine rotor blade defined in the above configuration (1), each of the central fillet portion, the upstream intermediate fillet portion, and the downstream intermediate fillet portion has a cross section demarcated by: a curved line connecting the suction surface and the upper surface of the platform portion, the curved line being defined by a part of an ellipse; a first line segment extending from a position where the curved line is connected to the suction surface to the upper surface of the platform portion along a blade height direction; and a second line segment extending from a position where the first line segment is connected to the upper surface of the platform portion to a position where the curved line is connected to the upper surface, a curvature radius of the ellipse defining the curved line in the upstream intermediate fillet portion is larger than a curvature radius of the ellipse defining the curved line in the central fillet portion, when compared at a same blade-height-directional position, and a curvature radius of the ellipse defining the curved line in the downstream intermediate fillet portion is larger than the curvature radius of the ellipse defining the curved line in the central fillet portion, when compared at the same blade-height-directional position.

With the turbine rotor blade defined in the above configuration (2), since, in the cross section of the suction side fillet portion, the curvature radius of the ellipse defining the above-described curved lines of the upstream intermediate fillet portion and the downstream intermediate fillet portion where the stress is likely to be high is higher than the curvature radius of the ellipse defining the above-described curved line of the central fillet portion where the stress is unlikely to be high, it is possible to suppress the stress concentration in the upstream intermediate fillet portion and the downstream intermediate fillet portion, as well as it is possible to suppress turbulence of a combustion gas flow in the central fillet portion and to suppress the deterioration in aerodynamic performance.

(3) A turbine rotor blade according to the present disclosure includes an airfoil portion having a pressure surface and a suction surface, a platform portion formed on a base end side of the airfoil portion, a shank portion formed opposite to the airfoil portion across the platform portion, and at least a suction side fillet portion of a fillet portion formed in a connection between the suction surface and an upper surface of the platform portion. The suction side fillet portion includes a central fillet portion which is formed at a position including a center of a length of the suction side fillet portion along an extension direction of the suction side fillet portion, an upstream intermediate fillet portion which is located between the central fillet portion and a front edge that is an upstream end of the suction side fillet portion, and in which a fillet height of the fillet portion from the upper surface of the platform portion is higher than the fillet height of the central fillet portion, a downstream intermediate fillet portion which is located between the central fillet portion and a rear edge that is a downstream end of the suction side fillet portion, and in which a fillet height of the fillet portion from the upper surface of the platform portion is higher than the fillet height of the central fillet portion, and a front edge fillet portion adjacent to an upstream side of the upstream intermediate fillet portion. The fillet height in the upstream intermediate fillet portion is higher than a fillet height in the front edge fillet portion.

With the turbine rotor blade defined in the above configuration (3), since, in the suction side fillet portion, the fillet heights in the upstream intermediate fillet portion and the downstream intermediate fillet portion where the stress is likely to be high are higher than the fillet height in the intermediate fillet portion where the stress is relatively low, it is possible to suppress the stress concentration. Thus, it is possible to improve the life of the turbine rotor blade due to bending creep. Further, as compared with the case where the fillet height is uniformly increased from the front edge to the rear edge of the suction side fillet portion, it is possible to suppress the deterioration in aerodynamic performance.

Further, it is possible to suppress the stress concentration in the upstream intermediate fillet portion where the stress is likely to be higher than in the front edge fillet portion. Further, as compared with the case where the fillet height is uniformly increased from the front edge to the rear edge of the suction side fillet portion, it is possible to suppress the deterioration in aerodynamic performance.

(4) A turbine rotor blade according to the present disclosure includes an airfoil portion having a pressure surface and a suction surface, a platform portion formed on a base end side of the airfoil portion, a shank portion formed opposite to the airfoil portion across the platform portion, and at least a suction side fillet portion of a fillet portion formed in a connection between the suction surface and an upper surface of the platform portion. The suction side fillet portion includes a central fillet portion which is formed at a position including a center of a length of the suction side fillet portion along an extension direction of the suction side fillet portion, an upstream intermediate fillet portion which is located between the central fillet portion and a front edge that is an upstream end of the suction side fillet portion, and in which a fillet height of the fillet portion from the upper surface of the platform portion is higher than the fillet height of the central fillet portion, a downstream intermediate fillet portion which is located between the central fillet portion and a rear edge that is a downstream end of the suction side fillet portion, and in which a fillet height of the fillet portion from the upper surface of the platform portion is higher than the fillet height of the central fillet portion, and a rear edge fillet portion adjacent to a downstream side of the downstream intermediate fillet portion. The fillet height in the downstream intermediate fillet portion is higher than a fillet height in the rear edge fillet portion.

With the turbine rotor blade defined in the above configuration (4), since, in the suction side fillet portion, the fillet heights in the upstream intermediate fillet portion and the downstream intermediate fillet portion where the stress is likely to be high are higher than the fillet height in the intermediate fillet portion where the stress is relatively low, it is possible to suppress the stress concentration. Thus, it is possible to improve the life of the turbine rotor blade due to bending creep. Further, as compared with the case where the fillet height is uniformly increased from the front edge to the rear edge of the suction side fillet portion, it is possible to suppress the deterioration in aerodynamic performance.

Further, it is possible to suppress the stress concentration in the downstream intermediate fillet portion where the stress is likely to be higher than in the rear edge fillet portion. Further, as compared with the case where the fillet height is uniformly increased from the front edge to the rear edge of the suction side fillet portion, it is possible to suppress the deterioration in aerodynamic performance.

(5) In some embodiments, in the turbine rotor blade defined in any one of the above configurations (1) to (4), the turbine rotor blade further includes a pressure side fillet portion formed in a connection between the pressure surface and the upper surface of the platform portion, the pressure side fillet portion includes a central fillet portion which is formed at a position including a center of a length of the suction side fillet portion along an extension direction of the pressure side fillet portion, and a fillet height of the central fillet portion in the pressure side fillet portion is higher than the fillet height of the central fillet portion in the suction side fillet portion.

With the turbine rotor blade defined in the above configuration (5), it possible to suppress the stress concentration in the central fillet portion where the stress is likely to be higher than in the central fillet portion of the suction side fillet portion. Further, as compared with the case where the fillet height of the central fillet portion in the suction side fillet portion and the fillet height of the central fillet portion in the pressure side fillet portion are uniformly increased, it is possible to suppress the deterioration in aerodynamic performance.

(6) A turbine rotor blade according to the present disclosure includes an airfoil portion having a pressure surface and a suction surface, a platform portion formed on a base end side of the airfoil portion, a shank portion formed opposite to the airfoil portion across the platform portion, and at least a suction side fillet portion of a fillet portion formed in a connection between the suction surface and an upper surface of the platform portion. The suction side fillet portion includes a central fillet portion which is formed at a position including a center of a length of the suction side fillet portion along an extension direction of the suction side fillet portion, an upstream intermediate fillet portion which is located between the central fillet portion and a front edge that is an upstream end of the suction side fillet portion, and in which a fillet height of the fillet portion from the upper surface of the platform portion is higher than the fillet height of the central fillet portion, and a downstream intermediate fillet portion which is located between the central fillet portion and a rear edge that is a downstream end of the suction side fillet portion, and in which a fillet height of the fillet portion from the upper surface of the platform portion is higher than the fillet height of the central fillet portion. The turbine rotor blade further comprises a pressure side fillet portion formed in a connection between the pressure surface and the upper surface of the platform portion. The pressure side fillet portion includes a central fillet portion which is formed at a position including a center of a length of the suction side fillet portion along an extension direction of the pressure side fillet portion. A fillet height of the central fillet portion in the pressure side fillet portion is higher than the fillet height of the central fillet portion in the suction side fillet portion. A boundary line between the suction surface and the upper surface of the platform portion includes two suction side sections overlapping the shank portion as viewed in the blade height direction. A boundary line between the pressure surface and the upper surface of the platform portion includes one pressure side section overlapping the shank portion as viewed in the blade height direction. The upstream intermediate fillet portion is formed along at least a part of one of the two suction side sections. The downstream intermediate fillet portion is formed along at least a part of the other of the two suction side sections. The central fillet portion of the pressure side fillet portion is formed along at least a part of the one pressure side section.

With the turbine rotor blade defined in the above configuration (6), since, in the suction side fillet portion, the fillet heights in the upstream intermediate fillet portion and the downstream intermediate fillet portion where the stress is likely to be high are higher than the fillet height in the intermediate fillet portion where the stress is relatively low, it is possible to suppress the stress concentration. Thus, it is possible to improve the life of the turbine rotor blade due to bending creep. Further, as compared with the case where the fillet height is uniformly increased from the front edge to the rear edge of the suction side fillet portion, it is possible to suppress the deterioration in aerodynamic performance.

Further, it is possible to suppress the stress concentration in the central fillet portion where the stress is likely to be higher than in the central fillet portion of the suction side fillet portion. Further, as compared with the case where the fillet height of the central fillet portion in the suction side fillet portion and the fillet height of the central fillet portion in the pressure side fillet portion are uniformly increased, it is possible to suppress the deterioration in aerodynamic performance.

Further, it is possible to suppress the stress concentration by increasing the fillet height in the section where the stress is likely to be high.

(7) In some embodiments, in the turbine rotor blade defined in the above configuration (6), the central fillet portion of the suction side fillet portion is formed along at least a part of a section interposed between the two suction side sections of a boundary line between the suction surface and the upper surface of the platform portion.

With the turbine rotor blade defined in the above configuration (7), it is possible to suppress the deterioration in aerodynamic performance by decreasing the fillet height in the section where the stress is less generated.

(8) A turbine rotor blade according to the present disclosure includes an airfoil portion having a pressure surface and a suction surface, a platform portion formed on a base end side of the airfoil portion, a shank portion formed opposite to the airfoil portion across the platform portion, and at least a suction side fillet portion of a fillet portion formed in a connection between the suction surface and an upper surface of the platform portion. The suction side fillet portion includes a central fillet portion which is formed at a position including a center of a length of the suction side fillet portion along an extension direction of the suction side fillet portion, an upstream intermediate fillet portion which is located between the central fillet portion and a front edge that is an upstream end of the suction side fillet portion, and in which a fillet height of the fillet portion from the upper surface of the platform portion is higher than the fillet height of the central fillet portion, and a downstream intermediate fillet portion which is located between the central fillet portion and a rear edge that is a downstream end of the suction side fillet portion, and in which a fillet height of the fillet portion from the upper surface of the platform portion is higher than the fillet height of the central fillet portion. The central fillet portion of the suction side fillet portion has a cross section demarcated by: a curved line connecting the suction surface and an end edge of the upper surface of the platform portion; a first line segment extending from a position where the curved line is connected to the suction surface to the upper surface of the platform portion along a blade height direction; and a second line segment extending from a position where the first line segment is connected to the upper surface of the platform portion to the end edge. The curved line is defined by a part of an ellipse. A center of the ellipse is located opposite to the airfoil portion across the end edge of the platform portion in a blade thickness direction. A position of a lower end of the ellipse is located below the end edge of the platform portion in the blade height direction.

With the turbine rotor blade defined in the above configuration (8), since, in the suction side fillet portion, the fillet heights in the upstream intermediate fillet portion and the downstream intermediate fillet portion where the stress is likely to be high are higher than the fillet height in the intermediate fillet portion where the stress is relatively low, it is possible to suppress the stress concentration. Thus, it is possible to improve the life of the turbine rotor blade due to bending creep. Further, as compared with the case where the fillet height is uniformly increased from the front edge to the rear edge of the suction side fillet portion, it is possible to suppress the deterioration in aerodynamic performance.

Further, as compared with the case where the lower end of the relatively small ellipse defining the above-described curved line is located at the position of the end edge of the platform portion (see FIG. 9), it is possible to suppress the stress concentration. Further, as compared with the case where the central fillet portion is formed (the case where the fillet cut surface is formed by aligning the position of the lower end of the ellipse with the position of the upper surface of the platform portion in the blade height direction) as shown in FIG. 10, it is advantageous in terms of aerodynamic performance.

(9) A turbine rotor blade according to the present disclosure includes an airfoil portion having a pressure surface and a suction surface, a platform portion formed on a base end side of the airfoil portion, a shank portion formed opposite to the airfoil portion across the platform portion, and at least a suction side fillet portion of a fillet portion formed in a connection between the suction surface and an upper surface of the platform portion. The suction side fillet portion includes a central fillet portion which is formed at a position including a center of a length of the suction side fillet portion along an extension direction of the suction side fillet portion, an upstream intermediate fillet portion which is located between the central fillet portion and a front edge that is an upstream end of the suction side fillet portion, and in which a fillet height from the upper surface of the platform portion is higher than the fillet height of the central fillet portion, and a downstream intermediate fillet portion which is located between the central fillet portion and a rear edge that is a downstream end of the suction side fillet portion, and in which the fillet height from the upper surface of the platform portion is higher than the fillet height of the central fillet portion. In the central fillet portion, a lower edge of a curved surface forming an outer surface of the central fillet portion intersects the upper surface of the platform portion with a predetermined inclination without being tangent to the upper surface of the platform portion at an end edge of the platform portion. In the upstream intermediate fillet portion and the downstream intermediate fillet portion, a lower edge of a curved surface forming an outer surface of each of the upstream intermediate fillet portion and the downstream intermediate fillet portion is tangent to the upper surface of the platform portion.

With the turbine rotor blade defined in the above configuration (9), since, in the fillet portion forming the upstream intermediate fillet portion and the downstream intermediate fillet portion, the lower edge of the curved surface forming the outer surface of the fillet portion is tangent to the upper surface of the platform portion at the end edge of the platform portion, whereas in the fillet portion forming the central fillet portion, the lower edge of the curved surface forming the outer surface of the fillet portion intersects the upper surface of the platform portion with the predetermined inclination without being tangent to the upper surface of the platform portion at the end edge of the platform portion, the relaxation of the stress concentration is effectively suppressed in the upstream intermediate fillet portion and the downstream intermediate fillet portion, and as for the central fillet portion having the relatively less stress concentration compared to the upstream intermediate fillet portion and the downstream intermediate fillet portion, it is possible to obtain the technical effect of being able to achieve both the relaxation of the stress concentration and the improvement in aerodynamic performance.

Advantageous Effects

According to the present disclosure, a turbine rotor blade is provided which is capable of suppressing stress concentration.

DETAILED DESCRIPTION

Figure 1:
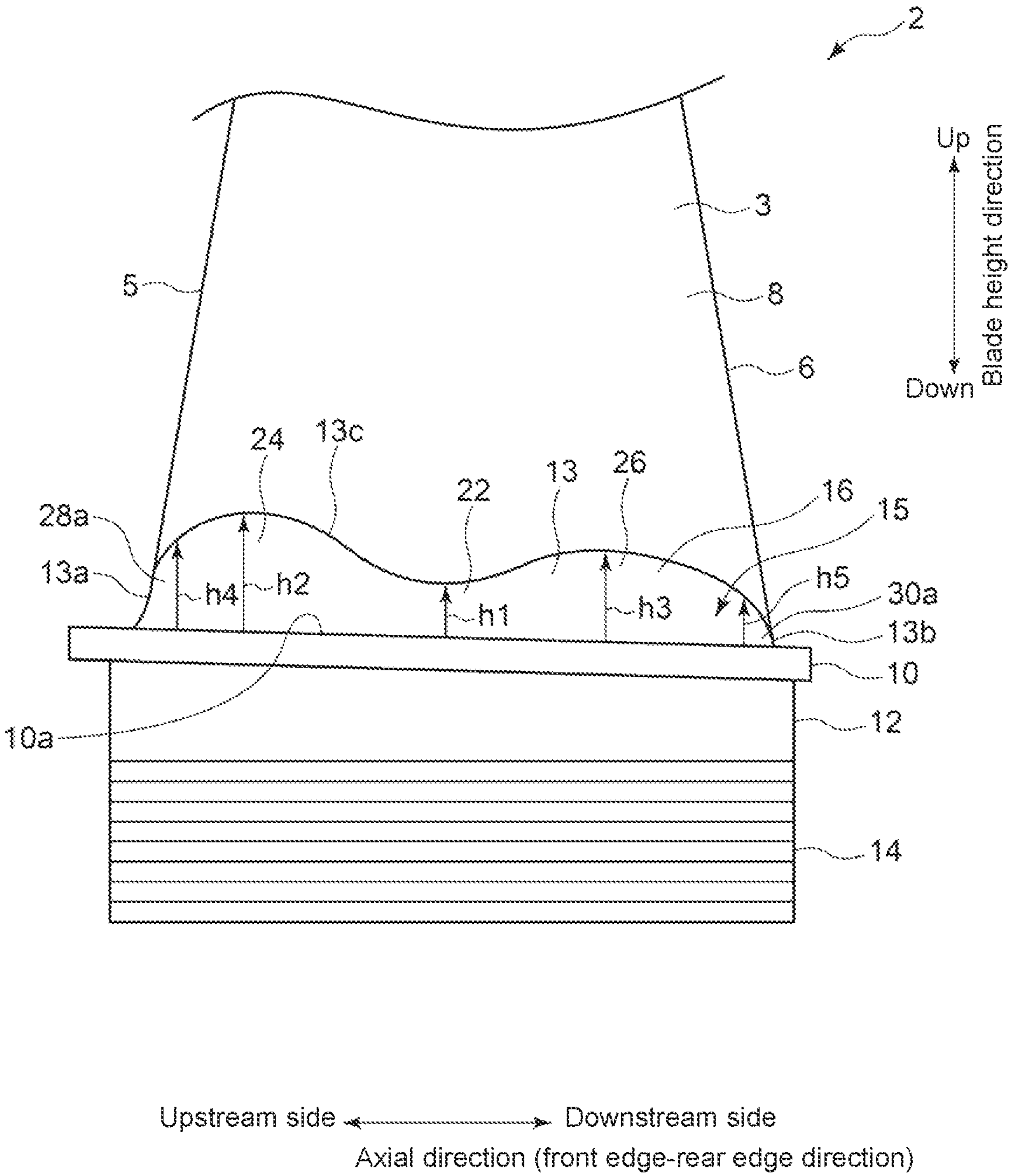
FIG. 1 is a side view showing the schematic configuration of a turbine rotor blade 2 according to an embodiment, and is a view of the turbine rotor blade 2 as viewed from the side of a suction surface 3.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

Figure 2:
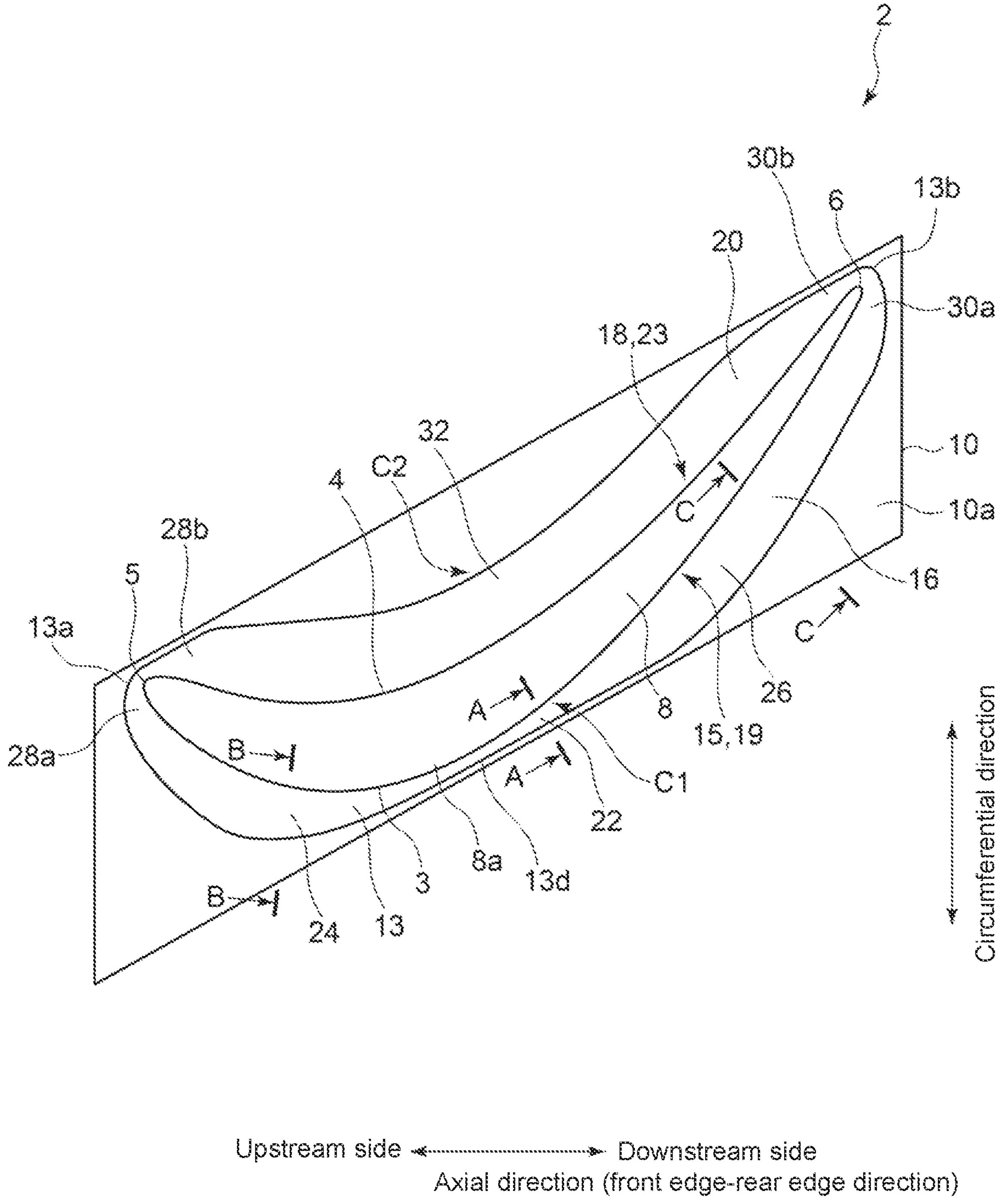
FIG. 2 is a top view of the turbine rotor blade 2 shown in FIG. 1, and is a view of the turbine rotor blade 2 as viewed from a tip end side along a blade height direction.

FIG. 1 is a side view showing the schematic configuration of a turbine rotor blade 2 according to an embodiment, and is a view of the turbine rotor blade 2 as viewed from the side of a suction surface 3. FIG. 2 is a top view of the turbine rotor blade 2 shown in FIG. 1, and is a view of the turbine rotor blade 2 as viewed from a tip end side along a blade height direction.

As shown in FIG. 1, a turbine rotor blade 2 includes an airfoil portion 8 internally including a cooling channel (not shown), a platform portion 10 formed on a base end side of the airfoil portion 8, a shank portion 12 formed opposite to the airfoil portion 8 across the platform portion 10, and a blade root portion 14 formed opposite to the platform portion 10 across the shank portion 12 and can be fitted into a blade groove of a turbine rotor (not shown). Hereinafter, a "circumferential direction" means a circumferential direction of the turbine rotor in a state where the turbine rotor blade 2 is attached to the turbine rotor (not shown).

As shown in FIG. 2, the airfoil portion 8 has the suction surface 3, a pressure surface 4, a blade leading edge 5, and a blade trailing edge 6. The suction surface 3 and the pressure surface 4 of the airfoil portion 8 extend in a direction of the blade leading edge 5 and a direction of the blade trailing edge 6, and the both surfaces are connected at the blade leading edge 5 and the blade trailing edge 6, and the airfoil portion 8 internally forms a cooling channel (not shown). As shown in at least one of FIGS. 1 and 2, the turbine rotor blade 2 includes a fillet portion 13 formed in connections 15, 18 between the airfoil portion 8 and the platform portion 10. The fillet portion 13 includes a suction side fillet portion 16 formed in the connection 15 between the suction surface 3 and an upper surface 10*a* of the platform portion 10 (a corner 19 formed by the suction surface 3 and the upper surface 10*a*), and a pressure side fillet portion 20 formed in the connection 18 between the pressure surface 4 and the upper surface 10*a* of the platform portion 10 (a corner 23 formed by the pressure surface 4 and the upper surface 10*a*). The fillet portion 13 is formed on the entire periphery around the airfoil portion 8, and extends in a blade height direction and a blade width direction (circumferential direction) starting from the connections 15, 18. The fillet portion 13 extending in the blade height direction is formed along an airfoil wall surface 8*a*, and a tip of the fillet portion 13 in the blade height direction forms an upper edge 13*c*. Further, the fillet portion 13 extending in the blade width direction is formed along the upper surface 10*a* of the platform portion 10 in the blade width direction (circumferential direction), and a tip of the fillet portion 13 at a position farthest from the airfoil portion 8 in the circumferential direction forms a lower edge 13*d* of the fillet portion 13.

As shown in FIGS. 1 and 2, the suction side fillet portion 16 includes a central fillet portion 22, an upstream intermediate fillet portion 24, a downstream intermediate fillet portion 26, a front edge fillet portion 28, and a rear edge fillet portion 30. The front edge fillet portion 28 is constituted by a suction side front edge fillet portion 28*a* formed on the side of the suction surface 3 and a pressure side front edge fillet portion 28*b* formed on the side of the pressure surface 4, with a front edge 13*a* as a boundary. The rear edge fillet portion 30 is constituted by a suction side rear edge fillet portion 30*a* formed on the side of the suction surface 3 and a pressure side rear edge fillet portion 30*b* formed on the side of the pressure surface 4, with a rear edge 13*b* as a boundary.

For example, as shown in FIG. 2, the central fillet portion 22 is formed at a position including a center C1 of the suction side fillet portion 16. The center C1 of the suction side fillet portion 16 means a center of a length of the suction side fillet portion 16 along an extension direction of the suction side fillet portion 16 (a length along the suction side fillet portion 16 from the front edge 16*a* which is an upstream end of the suction side fillet portion 16 to the rear edge 16*b* which is a downstream end of the suction side fillet portion 16).

For example, as shown in FIG. 1, the upstream intermediate fillet portion 24 is located between the suction side front edge fillet portion 28*a* and the central fillet portion 22. In the upstream intermediate fillet portion 24, a fillet height from the upper surface 10*a* of the platform portion 10 to the upper edge 13*c* of the fillet portion 13 is higher than a fillet height in the central fillet portion 22. That is, a fillet height h2 from the upper surface 10*a* of the platform portion 10 in the upstream intermediate fillet portion 24 is higher than a fillet height h1 from the upper surface 10*a* of the platform portion 10 in the central fillet portion 22. The "fillet height" in the present specification means a height from the upper surface 10*a* of the platform portion 10 along the blade height direction.

The downstream intermediate fillet portion 26 is located between the suction side rear edge fillet portion 30*a* and the central fillet portion 22. In the downstream intermediate fillet portion 26, a fillet height from the upper surface 10*a* of the platform portion 10 to the upper edge 13*c* of the fillet portion 13 is higher than the fillet height in the central fillet portion 22. That is, a fillet height h3 from the upper surface 10*a* of the platform portion 10 in the downstream intermediate fillet portion 26 is higher than the fillet height h1 from the upper surface 10*a* of the platform portion 10 in the central fillet portion 22.

The front edge fillet portion 28 (suction side front edge fillet portion 28*a*) is adjacent to the upstream side of the upstream intermediate fillet portion 24, and is formed in a range including the front edge 13*a* of the fillet portion 13. In the front edge fillet portion 28 (suction side front edge fillet portion 28*a*), a fillet height from the upper surface 10*a* of the platform portion 10 is lower than the fillet height in the upstream intermediate fillet portion 24. That is, the fillet height h2 from the upper surface 10*a* of the platform portion 10 in the upstream intermediate fillet portion 24 is higher than a fillet height h4 from the upper surface 10*a* of the platform portion 10 in the front edge fillet portion 28 (suction side front edge fillet portion 28*a*).

The rear edge fillet portion 30 (suction side rear edge fillet portion 30*a*) is adjacent to the downstream side of the downstream intermediate fillet portion 26, and is formed in a range including the rear edge 13*b* of the fillet portion 13. In the rear edge fillet portion 30 (suction side rear edge fillet portion 30*a*), a fillet height from the upper surface 10*a* of the platform portion 10 is lower than the fillet height in the downstream intermediate fillet portion 26. That is, the fillet height h3 from the upper surface 10*a* of the platform portion 10 in the downstream intermediate fillet portion 26 is higher than a fillet height h5 in the rear edge fillet portion 30 (suction side rear edge fillet portion 30*a*).

Further, as shown in FIG. 2, the pressure side fillet portion 20 includes a central fillet portion 32 formed at a position including a center C2 of the pressure side fillet portion 20. In the central fillet portion 32 of the pressure side fillet portion 20, a fillet height from the upper surface 10*a* of the platform portion 10 to the upper edge 13*c* of the fillet portion 13 is higher than a fillet height to the upper edge 13*c* in the central fillet portion 22 of the suction side fillet portion 16. That is, a fillet height h6 (not shown) in the central fillet portion 32 formed at the position including the center C2 of the pressure side fillet portion 20 is higher than the fillet height h1 (see FIG. 1) in the central fillet portion 22 at the center C1 of the suction side fillet portion 16. The center of the pressure side fillet portion 20 means a center of a length of the pressure side fillet portion 20 along an extension direction of the pressure side fillet portion 20 (a length along the pressure side fillet portion 20 from a front edge 20*a* which is an upstream end of the pressure side fillet portion 20 to a rear edge 20*b* which is a downstream end of the pressure side fillet portion 20).

Figure 3:
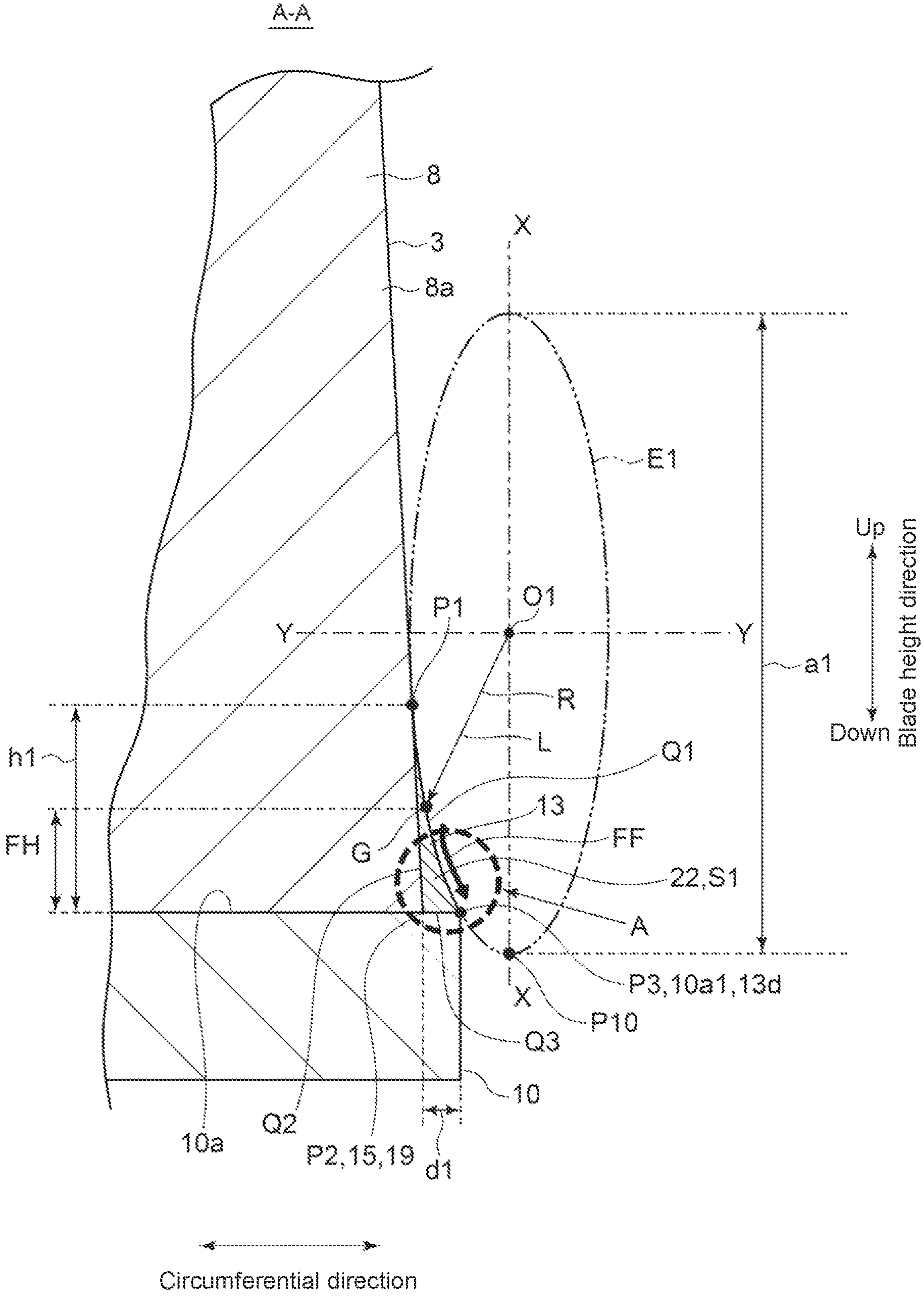
FIG. 3 is a schematic view for describing the configuration of a cross section taken along a line A-A in FIG. 2.
Figure 4:
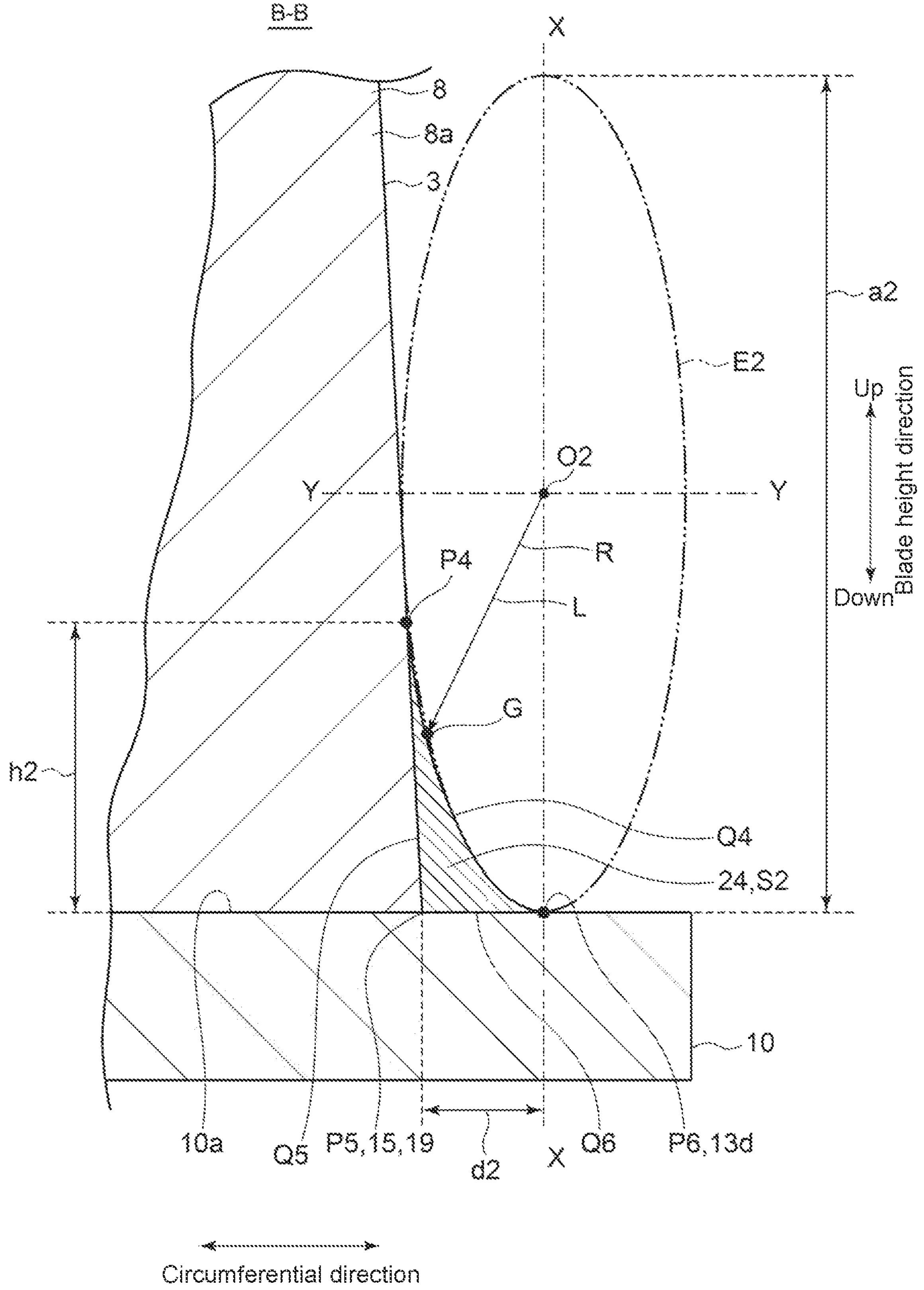
FIG. 4 is a schematic view for describing the configuration of a cross section taken along a line B-B in FIG. 2.
Figure 5:
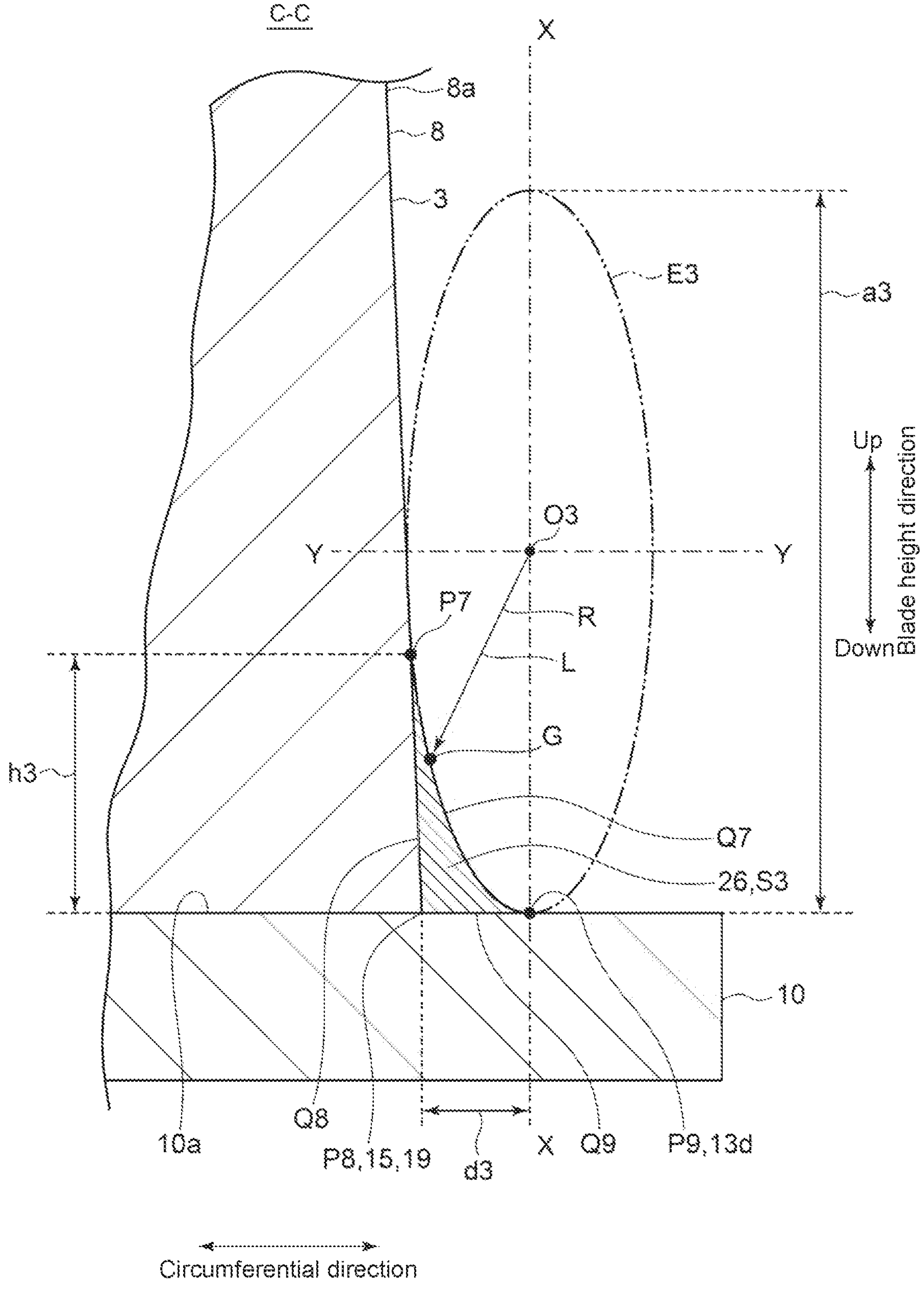
FIG. 5 is a schematic view for describing the configuration of a cross section taken along a line C-C in FIG. 2.

FIG. 3 is a schematic view for describing the configuration of a cross section taken along a line A-A in FIG. 2. FIG. 4 is a schematic view for describing the configuration of a cross section taken along a line B-B in FIG. 2. FIG. 5 is a schematic view for describing the configuration of across section taken along a line C-C in FIG. 2. In the present specification, the cross section of each fillet portion means a cross section orthogonal to the extension direction of each fillet portion.

As shown in FIGS. 3 and 4, a ratio (h2/d2) of the fillet height h2 to a fillet width d2 in the upstream intermediate fillet portion 24 is lower than a ratio (h1/d1) of the fillet height h1 to a fillet width d1 in the central fillet portion 22.

Further, as shown in FIGS. 4 and 5, a ratio (h3/d3) of the fillet height h3 to a fillet width d3 in the downstream intermediate fillet portion 26 is lower than the ratio (h1/d1) of the fillet height h1 to the fillet width d1 in the central fillet portion 22.

As shown in FIG. 3, a cross section S1 of the central fillet portion 22 is demarcated by a curved line Q1 connecting the suction surface 3 and an end edge 10*a*1 of the upper surface 10*a* of the platform portion 10, a line segment Q2 extending from a position P1 where the curved line Q1 is connected to the suction surface 3 to the upper surface 10*a* of the platform portion 10 along the blade height direction, and a line segment Q3 extending from a position P2 where the line segment Q2 is connected to the upper surface 10*a* of the platform portion 10 to a position P3 (a position of the end edge 10*a*1) where the curved line Q1 is connected to the upper surface 10*a*. Further, the curved line Q1 is defined by a part of a virtual ellipse E1. The virtual ellipse E1 is circumscribed about the suction surface 3 at the position P1 and passes through the end edge 10*a*1. Further, a center O1 of the virtual ellipse E1 is located opposite to the airfoil portion 8 across the end edge 10*a*1 of the platform portion 10 in the circumferential direction, and a position P10 of a lower end of the virtual ellipse E1 is located on a lower side in the blade height direction of the end edge 10*a*1 of the platform portion 10 in the blade height direction.

As shown in FIG. 4, a cross section S2 of the upstream intermediate fillet portion 24 is demarcated by a curved line Q4 smoothly connecting the suction surface 3 and the upper surface 10*a* of the platform portion 10, a line segment Q5 extending from a position P4 where the curved line Q4 is connected to the suction surface 3 to the upper surface 10*a* of the platform portion 10 along the blade height direction, and a line segment Q6 extending from a position P5 where the line segment Q5 is connected to the upper surface 10*a* of the platform portion 10 to a position P6 where the curved line Q4 is connected to the upper surface 10*a*. The curved line Q4 is defined by a part of a virtual ellipse E2. The virtual ellipse E2 is circumscribed about the suction surface 3 at the position P4 and is circumscribed about the upper surface 10*a* at the position P6.

As shown in FIG. 5, a cross section S3 of the downstream intermediate fillet portion 26 is demarcated by a curved line Q7 smoothly connecting the suction surface 3 and the upper surface 10*a* of the platform portion 10, a line segment Q8 extending from a position P7 where the curved line Q7 is connected to the suction surface 3 to the upper surface 10*a* of the platform portion 10 along the blade height direction, and a line segment Q9 extending from a position P8 where the line segment Q8 is connected to the upper surface 10*a* of the platform portion 10 to a position P9 where the curved line Q7 is connected to the upper surface 10*a*. The curved line Q7 is defined by a part of a virtual ellipse E3. The virtual ellipse E3 is circumscribed about the suction surface 3 at the position P7 and is circumscribed about the upper surface 10*a* at the position P9.

Herein, a major axis a2 of the virtual ellipse E2 defining the curved line Q4 in the upstream intermediate fillet portion 24 is larger than a major axis a1 of the virtual ellipse E1 defining the curved line Q1 in the central fillet portion 22. Further, an area of the cross section S2 of the upstream intermediate fillet portion 24 is larger than an area of the cross section S1 of the central fillet portion 22. Further, the fillet width d2 of the upstream intermediate fillet portion 24 is larger than the fillet width d1 of the central fillet portion 22. Further, the center O1 of the virtual ellipse E1 is located below each of the center O2 of the virtual ellipse E2 and the center O3 of the virtual ellipse E3 (the side of the platform portion 10) in the blade height direction. Further, a curvature radius R of the virtual ellipse E2 is larger than the curvature radius R of the virtual ellipse E1, when compared at a same blade-height-directional position.

Further, a major axis a3 of the virtual ellipse E3 defining the curved line Q7 in the downstream intermediate fillet portion 26 is larger than the major axis a1 of the virtual ellipse E1 defining the curved line Q1 in the central fillet portion 22. Further, an area of the cross section S3 of the downstream intermediate fillet portion 26 is larger than the area of the cross section S1 of the central fillet portion 22. Further, the fillet width d3 of the downstream intermediate fillet portion 26 is larger than the fillet width d1 of the central fillet portion 22. Further, the curvature radius R of the virtual ellipse E3 is larger than the curvature radius R of the virtual ellipse E1, when compared at a same blade-height-directional position.

Figure 6:
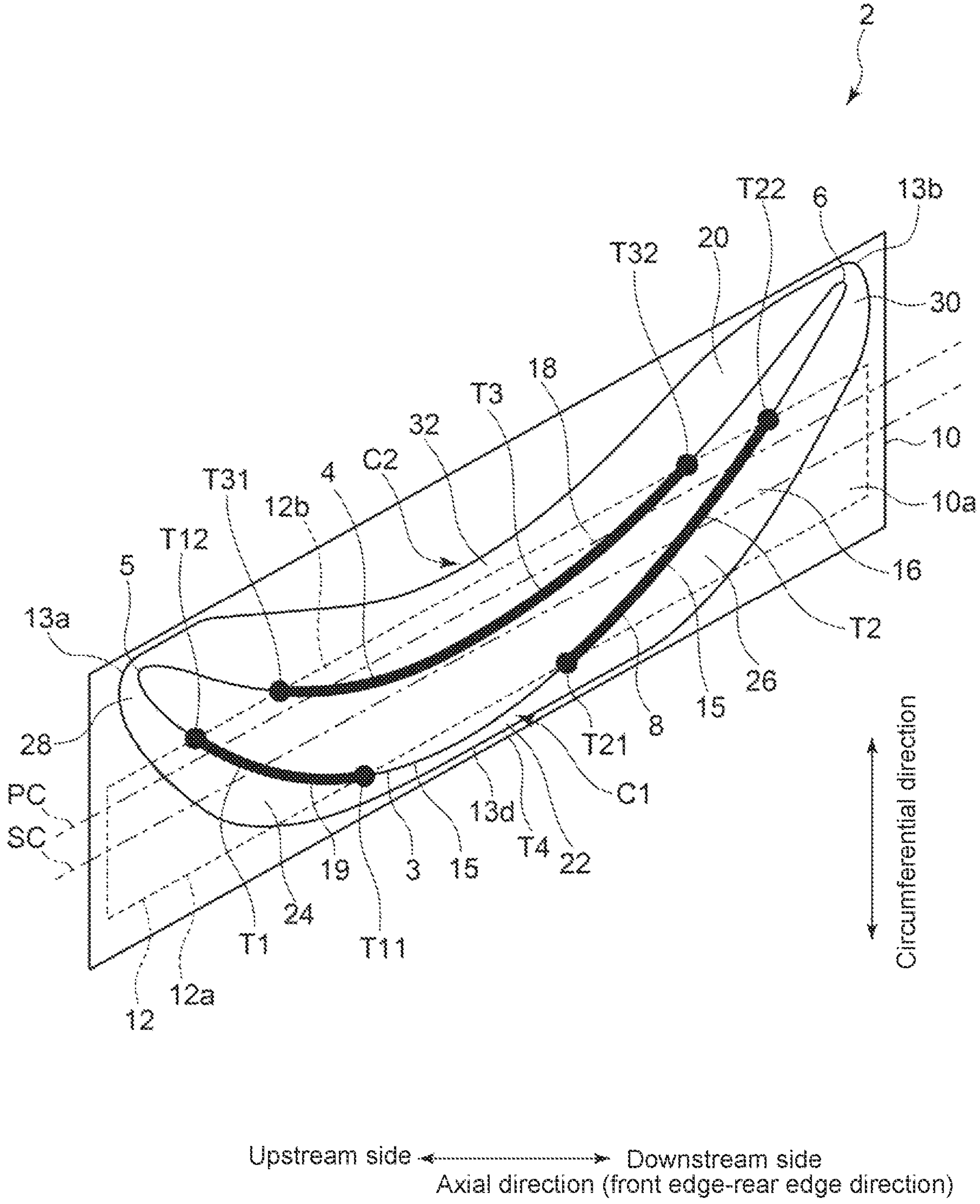
FIG. 6 is a view showing, by a dashed line, a range where a shank portion 12 exists regarding the top view (blade-height-directional view) of the turbine rotor blade 2 shown in FIG. 2.

FIG. 6 is a view showing, by a dashed line, a range where the shank portion 12 exists regarding the top view (blade-height-directional view) of the turbine rotor blade 2 shown in FIG. 2.

As shown in FIG. 6, the connection 15 between the suction surface 3 and the upper surface 10*a* of the platform portion 10 (a boundary line between the suction surface 3 and the upper surface 10*a* of the platform portion 10, that is, a line between the suction surface 3 and the upper surface 10*a* of the platform portion 10 connecting the above-described positions P2, P5, and P8 where the suction surface 3 and the upper surface 10*a* of the platform portion 10 are connected) includes two suction side sections T1 (position T11-position T12), T2 (position T21-position T22) (two thick line sections in FIG. 6) that overlap the shank portion 12 as viewed in the blade height direction. Further, the connection 18 between the pressure surface 4 and the upper surface 10*a* of the platform portion 10 (a boundary line between the suction surface 3 and the upper surface 10*a* of the platform portion 10) includes one pressure side section T3 (position T31-position T32)(one thick line section in FIG. 6) that overlaps the shank portion 12 as viewed in the blade height direction. The positions T11 and T21 respectively indicate positions where a visible outline 12*a* of the shank portion 12 on the side of the suction surface 3 and the connection 15 on the side of the suction surface 3 of the airfoil portion 8 intersect, and the positions T12 and T22 respectively indicate positions where a visible outline 12*b* of the shank portion 12 on the side of the pressure surface 4 and the connection 15 on the side of the suction surface 3 of the airfoil portion 8 intersect, and the positions T31 and T32 respectively indicate positions where the visible outline 12*b* of the shank portion 12 on the side of the pressure surface 4 and the connection 18 on the side of the pressure surface 4 of the airfoil portion 8 intersect.

The upstream intermediate fillet portion 24 is formed along at least a part of one of the above-described two suction side sections T1, T2 (a relatively axially upstream section of the suction side sections T1, T2), and the downstream intermediate fillet portion 26 is formed along at least a part of the other of the above-described two suction side sections T1. T2 (a relatively axially downstream section of the suction side sections T1, T2). The central fillet portion 32 of the pressure side fillet portion 20 is formed along at least a part of the above-described one pressure side section T3.

Further, the central fillet portion 22 of the suction side fillet portion 16 is formed along at least a part of a suction side section T4 interposed between the two suction side sections T1, T2 of the connection 15 between the suction surface 3 and the upper surface 10*a* of the platform portion 10.

Next, a technical effect in the above-described turbine rotor blade 2 will be described together with technical problems in a reference embodiment.

Figure 7:
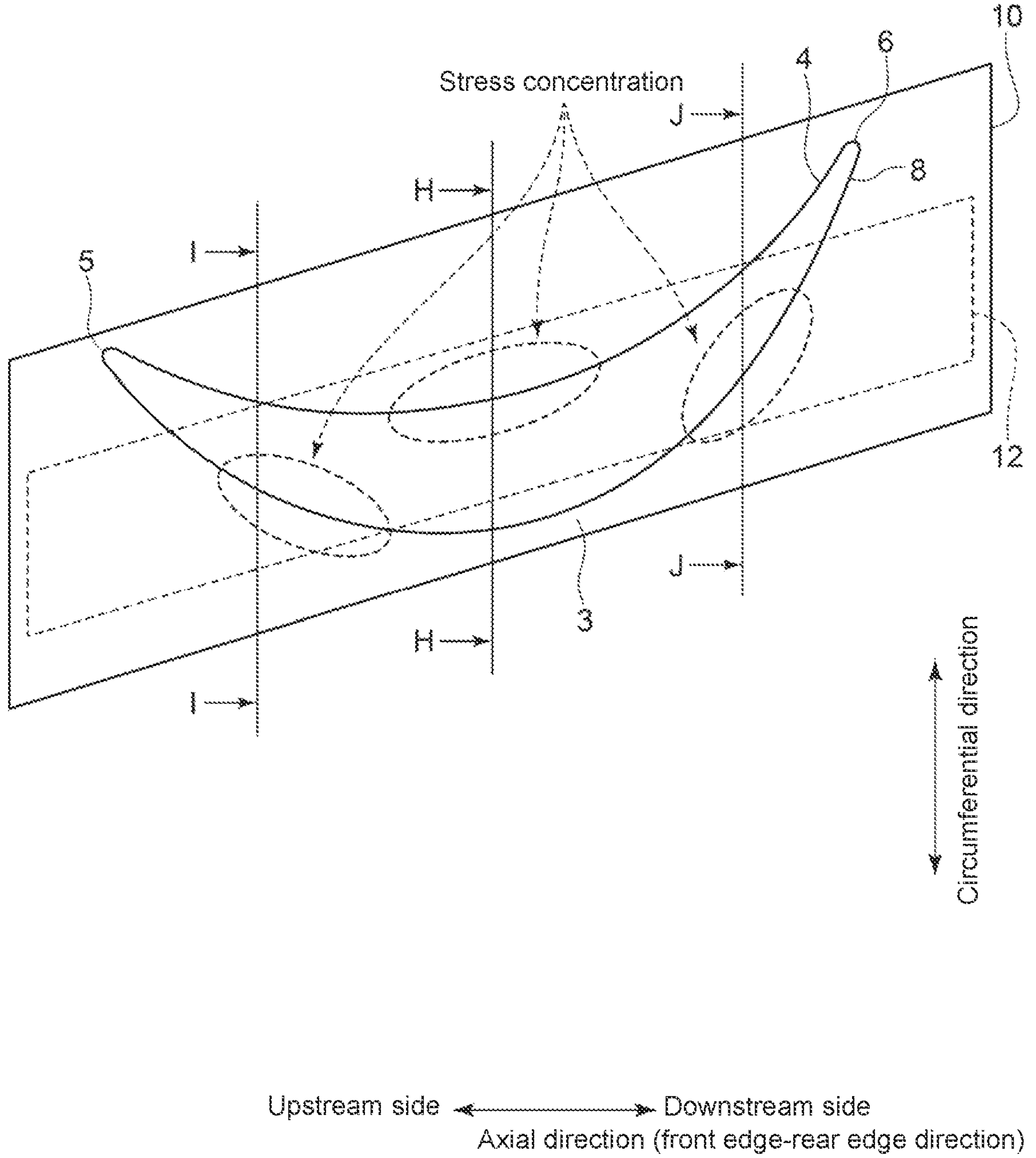
FIG. 7 is a top view of the turbine rotor blade according to a reference embodiment.
Figure 8A:
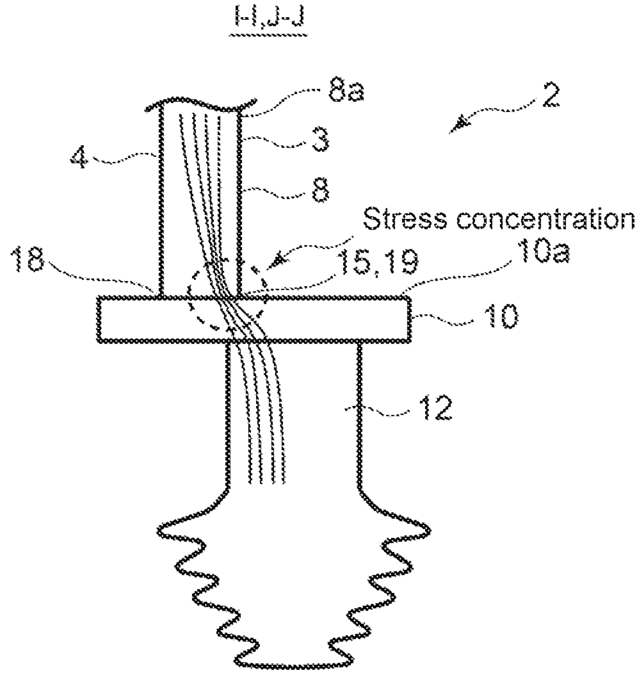
FIG. 8A is a view showing a flow of stress lines in a cross section taken along a line I-I and a cross section taken along a line J-J of FIG. 7.
Figure 8B:
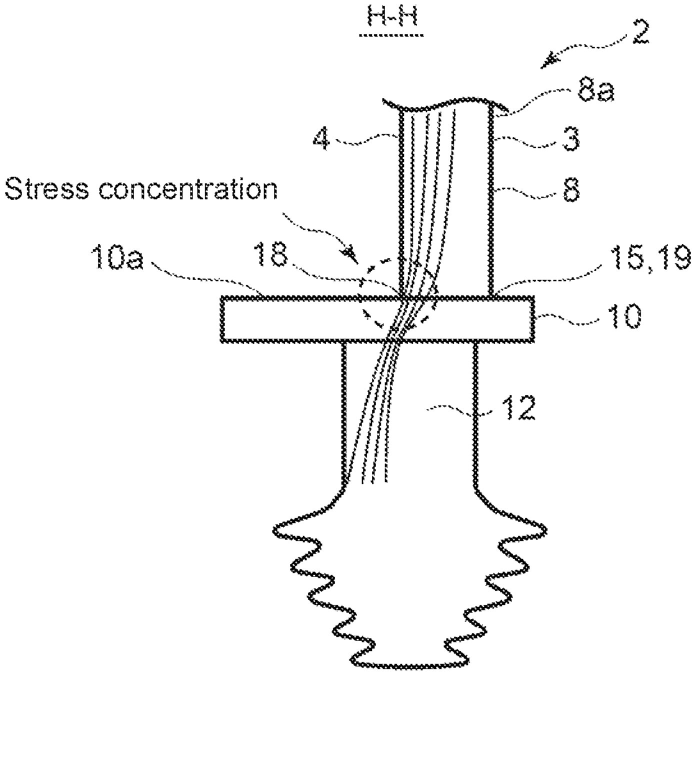
FIG. 8B is a view showing a flow of stress lines in a cross section taken along a line H-H of FIG. 7.

FIG. 7 is a top view of the turbine rotor blade according to the reference embodiment. FIG. 8A is a view showing a flow of stress lines in a cross section taken along a line I-I and a cross section taken along a line J-J of FIG. 7. FIG. 8B is a view showing a flow of stress lines in a cross section taken along a line H-H of FIG. 7.

As shown in FIGS. 7, 8A and 8B, with an operation of a gas turbine 1, in the connection 15, 18 between the airfoil portion 8 and the platform portion 10 in the turbine rotor blade 2, due to a circumferential deviation between the shape of the airfoil portion 8 and the shape of the shank portion 12, stress concentration occurs at the connection between the airfoil portion 8 and the platform portion 10. That is, as the rotor rotates, the airfoil portion 8, the platform portion 10, and the shank portion 12 receive a centrifugal force, causing the stress concentration around the connection 15 (section T1) between the platform portion 10 and the airfoil portion 8 at the position in the vicinity of the blade leading edge 5 on the suction surface 3, around the connection 15 (section T2) between the platform portion 10 and the airfoil portion 8 at the position in the vicinity of the blade trailing edge 6 on the suction surface 3, and around the connection 18 (section T3) between the platform portion 10 the airfoil portion 8 at the center position on the pressure surface 4. In particular, this phenomenon is remarkable in a large long blade where the length in the blade height direction is large compared to the blade width.

In this regard, in the above-described turbine rotor blade 2, as shown in FIG. 1, the fillet height h2 in the upstream intermediate fillet portion 24 located between the suction side front edge fillet portion 28*a* and the central fillet portion 22 is higher than the fillet height h1 in the central fillet portion 22, and the fillet height h3 in the downstream intermediate fillet portion 26 located between the suction side rear edge fillet portion 30*a* and the central fillet portion 22 is higher than the fillet height h1 in the central fillet portion 22. Thus, since the fillet height in the section of the suction side fillet portion 16 where the stress is likely to be high is higher than the fillet height in the low-stress section, making it possible to suppress the stress concentration. Thus, it is possible to reduce the excessive stress due to the stress concentration in the turbine rotor blade 2. Further, as compared with a case where the fillet height is uniformly increased from the front edge 13*a* to the rear edge 13*b* of the suction side fillet portion 16, by increasing the fillet height in the upstream intermediate fillet portion 24 of the suction side fillet portion 16 having a high stress and decreasing the fillet height in the central fillet portion 22 of the suction side fillet portion 16 having a low stress, it is possible to suppress deterioration in aerodynamic performance due to the formation of the large fillet portion 13 as much as possible.

Further, the fillet height h2 from the upper surface 10*a* of the platform portion 10 in the upstream intermediate fillet portion 24 is higher than the fillet height h4 from the upper surface 10*a* of the platform portion 10 in the front edge fillet portion 28 (suction side front edge fillet portion 28*a*). Thus, it possible to suppress the stress concentration in the upstream intermediate fillet portion 24 where the stress is likely to be higher than in the front edge fillet portion 28 (suction side front edge fillet portion 28*a*). Further, as compared with the case where the fillet height is uniformly increased from the front edge 13*a* to the rear edge 13*b* of the suction side fillet portion 16, by increasing the fillet height in the downstream intermediate fillet portion 26 of the suction side fillet portion 16 having a high stress and decreasing the fillet height in the front edge fillet portion 28 (suction side front edge fillet portion 28*a*) of the suction side fillet portion 16 having a low stress, it is possible to suppress the deterioration in aerodynamic performance due to the formation of the large fillet portion 13 as much as possible.

On the other hand, the fillet height h3 from the upper surface 10*a* of the platform portion 10 in the downstream intermediate fillet portion 26 is higher than the fillet height h1 in the central fillet portion 22. Thus, it is possible to suppress the stress concentration in the downstream intermediate fillet portion 26 where the stress is likely to be higher than in the central fillet portion 22. Further, as compared with a case where the fillet height is uniformly increased from the front edge 16*a* to the rear edge 16*b* of the suction side fillet portion 16, by increasing the fillet height in the downstream intermediate fillet portion 26 of the suction side fillet portion 16 having the high stress and decreasing the fillet height in the central fillet portion 22 of the suction side fillet portion 16 having the low stress, it is possible to suppress the deterioration in aerodynamic performance due to the formation of the large fillet portion 13 as much as possible.

Further, the fillet height h3 from the upper surface 10*a* of the platform portion 10 in the downstream intermediate fillet portion 26 is higher than the fillet height h5 in the rear edge fillet portion 30 (suction side rear edge fillet portion 30*a*). Thus, it possible to suppress the stress concentration in the downstream intermediate fillet portion 26 where the stress is likely to be higher than in the rear edge fillet portion 30 (suction side rear edge fillet portion 30*a*). Further, as compared with the case where the fillet height is uniformly increased from the front edge 16*a* to the rear edge 16*b* of the suction side fillet portion 16, by increasing the fillet height in the downstream intermediate fillet portion 26 of the suction side fillet portion 16 having the high stress and decreasing the fillet height in the rear edge fillet portion 30 (suction side rear edge fillet portion 30*a*) of the suction side fillet portion 16 having a low stress, it is possible to suppress the deterioration in aerodynamic performance due to the formation of the large fillet portion 13 as much as possible.

Further, as shown in FIGS. 3 to 5, the ratio (h2/d2) of the fillet height h2 to the fillet width d2 in the upstream intermediate fillet portion 24 is lower than the ratio (h1/d1) of the fillet height h1 to the fillet width d1 in the central fillet portion 22, and the ratio (h3/d3) of the fillet height h3 to the fillet width d3 in the downstream intermediate fillet portion 26 is lower than the ratio (h1/d1) of the fillet height h1 to the fillet width d1 in the central fillet portion 22. That is, in the upstream intermediate fillet portion 24 and the downstream intermediate fillet portion 26 where it is relatively easy to secure the fillet width on the upper surface 10*a* of the platform portion 10, the ratio (elliptical ratio) of the fillet height to the fillet width is lower than in the central fillet portion 22 where it is difficult to secure the fillet width. Thus, it is possible to suppress the deterioration in aerodynamic performance while suppressing the above-described stress concentration. A difference in fillet shape due to the difference in fillet position will be described later.

Further, the fillet height h6 of the central fillet portion 32 in the pressure side fillet portion 20 is higher than the fillet height h1 of the central fillet portion 22 in the suction side fillet portion 16. Thus, it is possible to suppress the stress concentration in the central fillet portion 32 where the stress is likely to be higher than in the central fillet portion 22 of the suction side fillet portion 16. Further, as compared with the case where the fillet height of the central fillet portion 22 in the suction side fillet portion 16 and the fillet height of the central fillet portion 32 in the pressure side fillet portion 20 are uniformly increased, it is possible to suppress the deterioration in aerodynamic performance.

Further, as shown in FIGS. 3 to 5, in the cross section S1, S2, S3 of the suction side fillet portion 16, since the major axis a2 of the virtual ellipse E2 defining the above-described curved line Q4 and the major axis a3 of the virtual ellipse E3 defining the above-described curved line Q7 are larger than the major axis a1 of the virtual ellipse E1 defining the above-described curved line Q1, it is possible to suppress the stress concentration to the section of the suction side fillet portion 16 where the stress is likely to be high.

Figure 9:
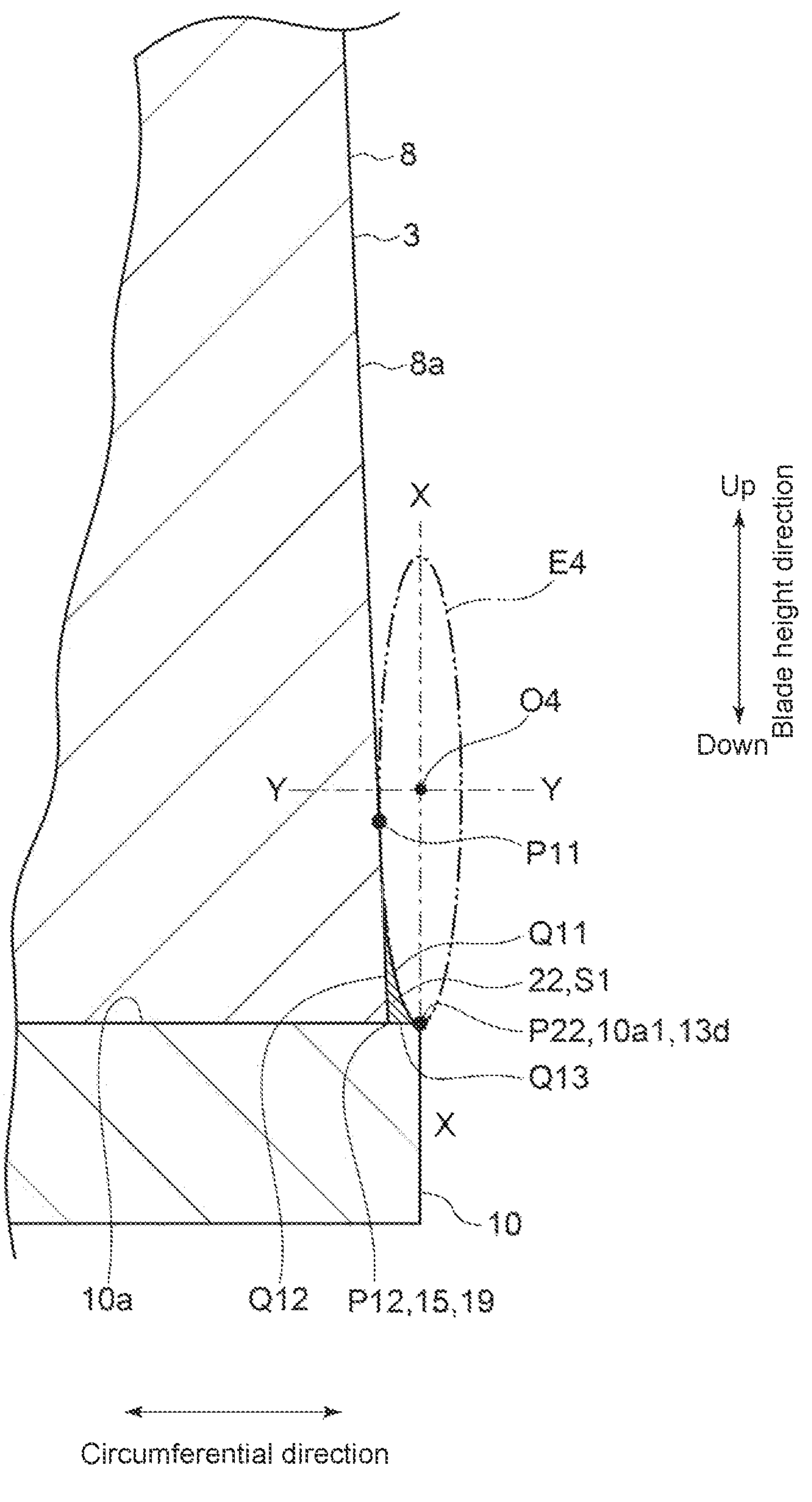
FIG. 9 is a schematic view for describing another configuration example of the cross section taken along the line B-B in FIG. 2.
Figure 10:
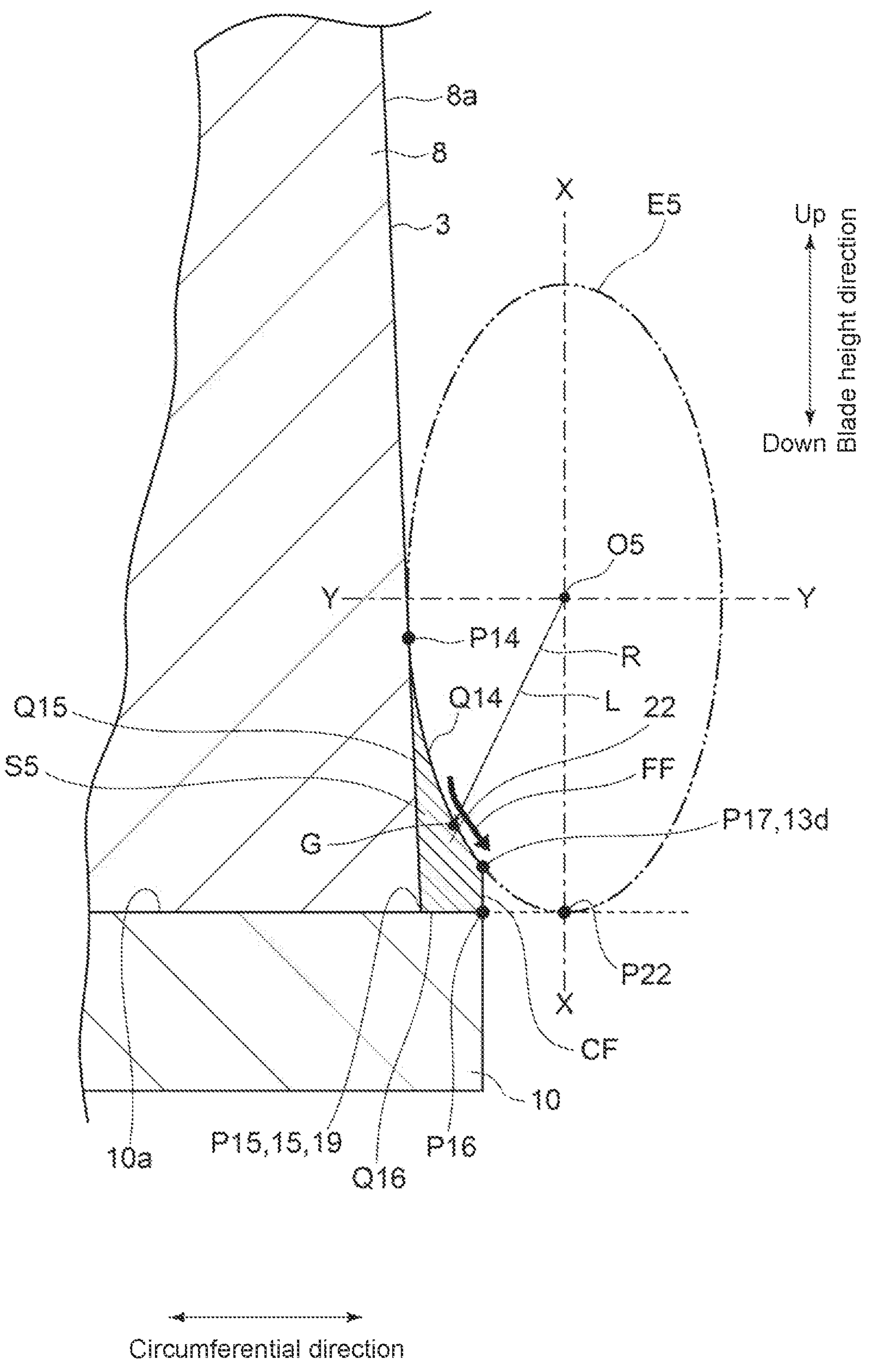
FIG. 10 is a schematic view for describing another configuration example of the cross section taken along the line B-B in FIG. 2.

Further, as shown in FIG. 3, in the cross section S1 of the central fillet portion 22, the center O1 of the virtual ellipse E1 is located opposite to the airfoil portion 8 across the end edge 10*a*1 of the platform portion 10 in the blade thickness direction of the airfoil portion 8 (the circumferential direction of the turbine rotor (not shown)), and the position P10 of the lower end of the virtual ellipse E1 is located below the end edge 10*a*1 of the platform portion 10 in the blade height direction. Thus, for example, as compared with the case where the lower end of the relatively small ellipse defining the curved line Q1 is located at the position of the end edge 10*a*1 of the platform portion 10 as shown in FIG. 9, it is possible to suppress the stress concentration. Further, as compared with a case where a central fillet portion 022 is formed (a case where a fillet cut surface CF is formed by aligning the position of the lower end of the ellipse with a position of an upper surface 010*a* of a platform portion 010 in the blade height direction) as shown in FIG. 10, it is advantageous in terms of aerodynamic performance.

Further, as shown in FIG. 6, the upstream intermediate fillet portion 24 of the suction side fillet portion 16 is formed along at least a part of the suction side section T1 where the stress is likely to be high, and the downstream intermediate fillet portion 26 of the suction side fillet portion 16 is formed along at least a part of the suction side section T2 where the stress is likely to be high. Thus, it is possible to suppress the stress concentration by increasing the fillet height in the section where the stress concentration is likely to occur, and to suppress the deterioration in aerodynamic performance by decreasing the fillet height in another low-stress section.

Further, the central fillet portion 22 of the suction side fillet portion 16 is formed along at least a part of the suction side section T4, which is interposed between the two suction side sections T1, T2 and has the relatively low stress, of the connection 15 between the suction surface 3 and the upper surface 10*a* of the platform portion 10. Thus, it is possible to suppress the deterioration in aerodynamic performance by decreasing the fillet height in the low-stress section.

Figure 11:
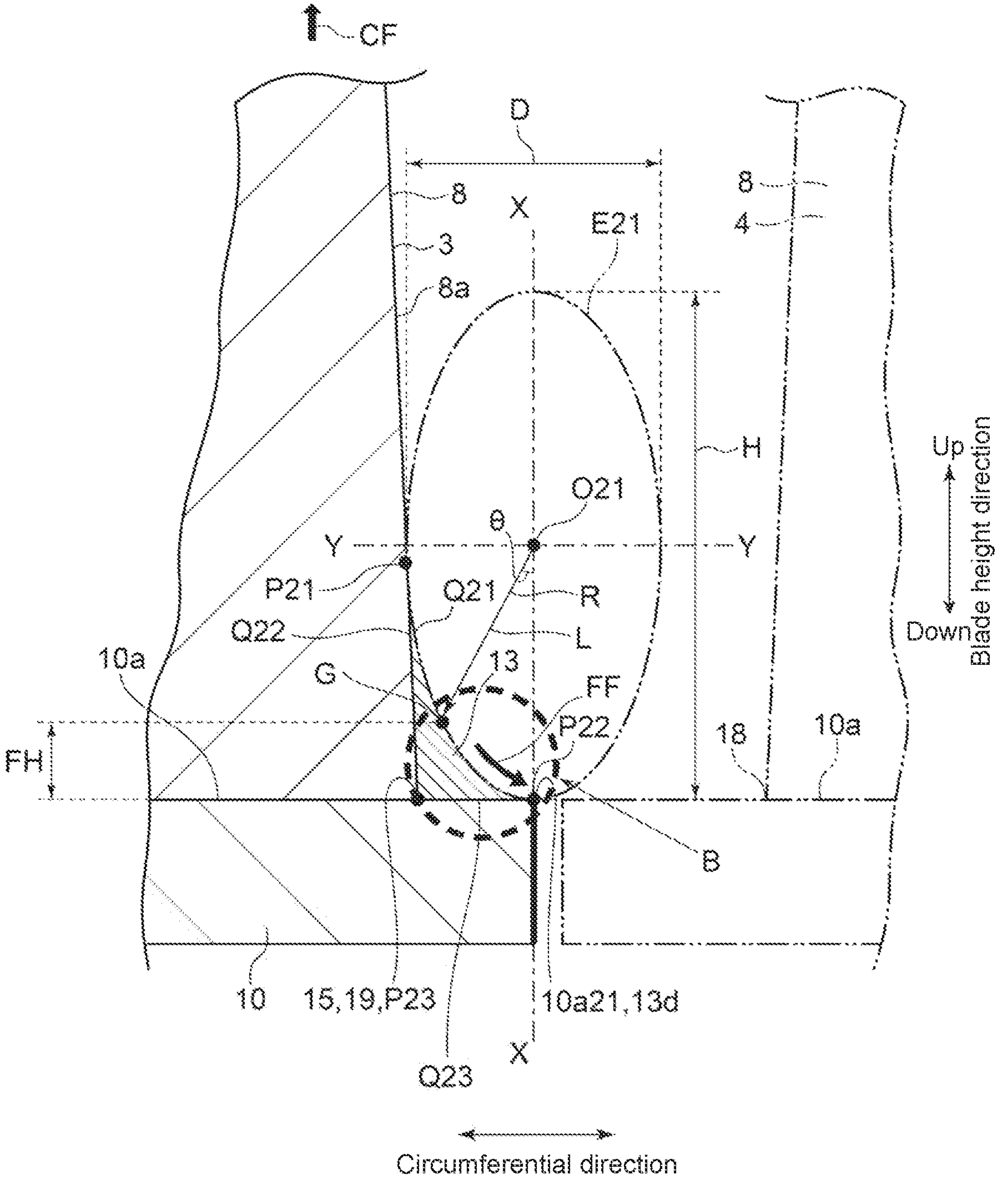
FIG. 11 is a schematic view showing a relationship between a blade structure and a fillet shape.

FIG. 11 is a schematic view showing a relationship between the shape of the fillet portion and a blade structure including adjacent blades disposed adjacent to each other in the circumferential direction. A structure for relaxing the stress concentration due to the centrifugal force applied to the connection 15, 18 between the airfoil portion 8 and the platform portion 10 will be described below.

As shown in FIG. 11, an outer shape of the fillet portion 13 formed in the connection 15, 18 between the airfoil portion 8 and the platform portion 10 can be displayed with a part of a shape of a virtual ellipse E21. The virtual ellipse E21 is circumscribed about the airfoil wall surface 8*a* at a position P21 of the airfoil portion 8, and a lower end P22 of the virtual ellipse E21 in the blade height direction is disposed to be circumscribed about an end edge 10*a*21 of the upper surface 10*a* of the platform portion 10. Even if the position of the lower end P22 is closer to the side of the airfoil portion 8 than the edge 10*a*21, the shape of the virtual ellipse E21 does not change. Reference sign P23 denotes a position of the connection 15 where the airfoil wall surface 8*a* of the airfoil portion 8 on the side of the suction surface 3 and the upper surface 10*a* of the platform portion 10 are joined. The cross section of the fillet portion 13 in a direction orthogonal to a front edge-rear edge direction in which the fillet portion 13 extends is displayed as a cross section of a substantially triangle that is surrounded by a curved line Q21, which is a part of the virtual ellipse E21 formed by the curvature radius R connecting the position P21 and the position P22 and is formed into a concave shape, and a line segment Q22 and a line segment Q23 connecting the position P21 and the position P23 and the position P22 and the position P23, respectively.

As shown in FIG. 11, a ratio (H/D) of a major axis H to a minor axis D is called an elliptical ratio, where H is the major axis of the virtual ellipse E21 in a major axis X direction and D is the minor axis of the virtual ellipse E21 in a minor axis Y direction. A cross-sectional shape of the fillet portion 13 capable of absorbing the stress concentration caused in the connection 15 can be selected by the size of the curvature radius R of the virtual ellipse E21. If the stress concentration is large, it is necessary to increase the curvature radius R by increasing the major axis H, the minor axis D of the virtual ellipse E21.

Herein, the relationship between the fillet shape and the blade structure in the vicinity of the connection 15, 18 between the airfoil portion 8 and the platform portion 10 on which the stress concentration acts will specifically be described.

As shown in FIG. 8A, in the vicinity of the connection 15 where the airfoil wall surface 8*a* of the airfoil portion 8 on the side of the suction surface 3 is connected to the upper surface 10*a* of the platform portion 10, the cross-sectional shape on the side of the platform portion 10 to which the airfoil portion 8 is connected suddenly changes in the axial direction and the circumferential direction, relative to the cross-sectional shape on the side of the airfoil portion 8. That is, the corner (edge) 19 is formed in the connection 15 where the airfoil wall surface 8*a* and the upper surface 10*a* of the platform portion 10 intersect, and the cross-sectional shape changes above and below the corner (edge) 19 in the blade height direction, causing the stress concentration centering around the position of the corner (edge) 19 where the cross-sectional shape changes. Therefore, in order to relax the stress concentration caused at the corner (edge) 19 of the connection 15, it is desirable to make the change in cross-sectional shape at the corner (edge) 19 as smooth as possible in the blade height direction. Thus, forming the fillet portion 13 on the outer peripheral side of the connection 15 on the airfoil wall surface 8*a* leads to mitigating the sudden change in cross-sectional shape in the vicinity of the connection 15 of the airfoil portion 8. That is, in FIG. 11, forming the fillet portion 13 on the outer peripheral side of the connection 15 on the airfoil wall surface 8*a* suppresses the sudden change in cross-sectional shape in the connection 15 of the airfoil portion 8. By forming the fillet portion 13 having a curved surface or a curved line with a predetermined curvature on the outer peripheral side of the airfoil wall surface 8*a* instead of the corner (edge) 19 in the connection 15 on the airfoil wall surface 8*a*, the sudden change in cross-sectional shape in the connection 15 in the blade height direction is mitigated, the cross-sectional shape changes gradually, and the stress concentration is suppressed. The curved surface or the curved line with the predetermined curvature radius R formed in the connection 15 corresponds to the curved line Q21 and forms the outer surface of the fillet portion 13.

As shown in FIG. 11, the curvature radius R of the virtual ellipse E21 means a length L between an ellipse center O21 and any position G of the virtual ellipse E21. A method for calculating the curvature radius R of the virtual ellipse E21 can generally calculate the curvature radius R by:

$$(X^2/H^2\times(Y^2/D^2)=1/4;\ \text{and} \qquad \text{[Expression 1]}$$

$$R=(H\times D)/2\times 4\sqrt{}[(1+(\tan\theta)^2)/(D^2+H^2\times(\tan\theta)^2)]. \qquad \text{[Expression 2]}$$

Herein, Expression 1 is a general expression of an ellipse. Expression 2 is an expression which is calculated from Expression 1 and calculates the curvature radius R at an angle θ. As shown in FIG. 11, the angle θ means an angle formed by the curvature radius R in the clockwise direction from the axis of the major axis X. The coefficient H indicated in Expression 1 and Expression 2 means the major axis H of the ellipse, and the coefficient D indicated in Expression 1 and Expression 2 means the minor axis D of the ellipse.

As long as the angle θ formed by the curvature radius R of the virtual ellipse E21 with the major axis X is selected, the position G of the virtual ellipse E21 can be determined and the length L can be decided. A part of a locus of the virtual ellipse E21 coincides with the curved line Q21 forming the outer surface of the fillet portion 13. As described above, by increasing the curvature radius R of the curved line Q21, the rate of the change in cross-sectional shape in the connection 15 becomes gentle, and the stress concentration in the connection 15 is suppressed. The curvature radius R of the fillet portion 13 can change the magnitude of the curvature radius R by moving the position of the ellipse center O21 in the major axis X direction and the minor axis Y direction. For example, in FIG. 11, if the position of the center O21 of the virtual ellipse E21 is moved in a direction away from the airfoil portion 8 in the circumferential direction while the virtual ellipse E21 is circumscribed about the position P21 of the airfoil wall surface 8*a* and the position P22 on the upper surface 10*a* of the platform portion 10 with the elliptical ratio (H/D) being maintained, the position P21 on the airfoil wall surface 8*a* moves upward in the blade height direction, and the position P22 on the upper surface 10*a* of the platform portion 10 is moved in the circumferential direction. Therefore, the major axis H and the minor axis D of the virtual ellipse E21 increase, and the curvature radius R of the curved line Q21 of the fillet portion 13 increases, suppressing the stress concentration caused in the connection 15. Instead of the angle θ, a height FH (blade-height-directional position) from the upper surface 10*a* of the platform portion 10 at the position G may be selected to select the curvature radius R.

From the viewpoint of suppressing the stress concentration in the connection 15, it is only necessary to increase the curvature radius R of the virtual ellipse E21 as much as possible, and as a result, it is possible to increase the curvature radius R of the curved line Q21 forming a part of the fillet portion 13. Even if the fillet height of the fillet portion 13 is the same, the larger the fillet width is, the larger the curvature radius R of the fillet portion 13 is. Even if the fillet width is the same, the higher the fillet height is, the larger the curvature radius R of the fillet portion 13 is. As described above, the curvature radius R is a value determined by Expression 2, and as each of the major axis H and the minor axis D increases, the curvature radius R also increases. There is no direct relevance between the magnitude of the curvature radius R of the fillet portion 13 and the magnitude of the elliptical ratio (H/D). Selection of the elliptical ratio (H/D) desirably selects the major axis H and the minor axis D which are appropriate from both aspects of a reduction in stress concentration and aerodynamic performance.

The above description is about the structure regarding suppression of the stress concentration in the connection 15 on the side of the suction surface 3 of the airfoil portion 8. However, also in the connection 18 where the airfoil wall surface 8*a* of the airfoil portion 8 on the side of the pressure surface 4 is connected the upper surface 10*a* of the platform portion 10, the effect of suppressing the stress concentration is obtained by increasing the curvature radius R of the fillet portion 13 in the same manner.

On the other hand, there are limits to the blade height of the airfoil portion 8 and the circumferential width of the platform portion 10, and there is a limit to the curvature radius R that the fillet portion 13 can take. Further, the fillet having a cross-sectional shape in which the outer shape of the fillet expands outward into a convex shape turbulates a flow of a combustion gas flow FF flowing through the outer surface of the fillet, which is disadvantageous in terms of aerodynamic performance.

Therefore, in the large long blade, as a means for avoiding the stress concentration in the connection 15, 18 due to the centrifugal force, unless there is a limitation from the blade structure, it is desirable to select, as the curvature radius R of the fillet portion 13, the curvature radius R as large as possible. However, since the increase in fillet shape is disadvantageous in terms of aerodynamic performance, it is desirable to select the fillet shape from both aspects of the stress concentration and aerodynamic performance.

In the case of the large long blade, the width of the platform portion 10 in the circumferential direction is relatively narrow, compared to the width in the axial direction (front edge-rear edge direction). In particular, the airfoil portion 8 forms a convex curved surface on the side of the suction surface 3 and forms a curved surface on a concave surface on the side of the pressure surface 4. Therefore, if the airfoil portion 8 is disposed on the platform portion 10, a width between the end edge 10*a*1 of the platform portion 10 and the airfoil wall surface 8*a* of the airfoil portion 8 on the side of the suction surface 3 may be narrow depends on the position of the airfoil wall surface 8*a* in the front edge-rear edge direction.

On the other hand, as shown in FIGS. 6 and 8A, 8B, the airfoil portion 8 and the platform portion 10 are supported by the blade root portion 14 via the shank portion 12. Therefore, an axial center SC of the shank portion 12 is displaced from an axial center PC of the platform portion 10 to the side of the suction surface 3 of the airfoil portion 8.

In general, since the centrifugal force acts on the airfoil portion 8 of the turbine rotor blade, a fillet of a certain size is formed on the entire periphery of the airfoil portion 8, suppressing generation of an excessive stress. However, in the case of the large long blade as shown in FIGS. 1, 2 and 6 which is one aspect of the present embodiment, depending on the circumferential position of the airfoil portion 8, it is difficult to form the fillet portion 13 on the outer peripheral side of the airfoil wall surface 8*a* with a constant width from the airfoil wall surface 8*a*, and the circumferential width of the fillet portion 13 may be reduced due to the arrangement space of the fillet portion 13. On the other hand, the fillet portion 13 in the suction side section T4 (between the position T11 and the position T21) where the central fillet portion 22 is formed includes the connection 15 on the side of the suction surface 3 of the airfoil portion 8 which is formed on the circumferentially outer side of the visible outline 12*a* of the shank portion 12 on the side of the suction surface 3. As shown in FIGS. 7 and 8B, a flow of stress lines at the center (the cross section taken along the line H-H) of the airfoil portion 8 in the axial direction (front edge-rear edge direction) concentrates not on the side of the suction surface 3 but on the side of the pressure surface 4, and the stress concentration in the suction side section T4 is relatively low compared to that in the suction side section T1, T2. Therefore, in view of both the restriction of the arrangement space where the fillet portion 22 is formed and the stress concentration which is relatively low compared to that in the upstream intermediate fillet portion 24 and the downstream intermediate fillet portion 26, it is desirable that the fillet shape of the central fillet portion 22 formed in the suction side section T4 selects the major axis H and the minor axis D of the virtual ellipse from the viewpoint of reducing the stress concentration in the fillet portion 22 and improving aerodynamic performance and decides the shape of the fillet portion 13.

In the case where the fillet shape of the central fillet portion 22 is selected, as shown in FIG. 9, if a lower end P22 of a virtual ellipse E4 is disposed at the end edge 10*a*1 of the platform portion 10 or can be disposed on the upper surface 10*a* between the end edge 10*a*1 and the airfoil portion 8, it is most desirable in terms of the stress concentration and aerodynamic performance.

Typically, the shape of the virtual ellipse selects the elliptical ratio (H/D) having a constant ratio over the entire periphery of the airfoil portion 8, and selects the major axis H, the minor axis D capable of suppressing the stress concentration. On the other hand, depending on the blade structure, even if the high elliptical ratio (H/D) is selected, it is impossible to suppress the stress concentration, and a maximum stress due to the stress concentration acting on the fillet portion 13 may exceed an allowable value. For example, as the cross-sectional shape of the fillet portion 13 shown in FIG. 9, a method for suppressing the stress concentration by forming the major axis H which is relatively large compared to the minor axis D of the virtual ellipse E4, and selecting the virtual ellipse E4 elongated in the blade height direction is also conceivable. However, there is a limit to the blade height, and there is also a limit to the selectable range of the major axis H. In that case, as the airfoil portion 8 shown in FIG. 10, a choice to set the curvature radius R large by increasing both the major axis H and the minor axis D compared to the airfoil portion 8 shown in FIG. 9 is also possible. In the embodiment shown in FIG. 10, the position of the lower end P22 of the virtual ellipse E21 is maintained at the same height as the upper surface 10*a* of the platform portion 10.

As shown in the embodiment of FIG. 10, a virtual ellipse E5 is circumscribed about the airfoil wall surface 8*a* of the airfoil portion 8 at a position P14 and is circumscribed on an extension line of the upper surface 10*a* of the platform portion 10 at the position P22. Further, the airfoil wall surface 8*a* and the upper surface 10*a* of the platform portion 10 are connected at a position P15, forming the connection 15. Moreover, the platform portion 10 is extended upward in the blade height direction in parallel to the major axis X from the end edge 10*a*1 (position P16), and is connected to the virtual ellipse E5 at a position P17.

In the case of the structure shown in FIG. 10, the position of the major axis X passing through a center O5 of the virtual ellipse E5 is displaced from the circumferential position of the end edge 10*a*1 of the platform portion 10 to the circumferentially outer side on the opposite side of the airfoil portion 8, and the fillet portion 13 is cut on the surface CF that passes through the end edge 10*a*1 of the platform portion 10 and is parallel to the major axis X. The cross-sectional shape of the fillet portion 13 of the present mode is a cross section which is surrounded by the cut surface CF formed by a curved line Q14 connecting the position P14 and the position P17 and forming a part of the concave curved surface of the fillet portion 13, a line segment Q15 connecting the position P14 and the position P15, a line segment Q16 connecting the position P15 and the position P16, and a line segment connecting the position P16 and the position P17. However, in the case of the present mode, the flow of the combustion gas flow FF flowing along the curved line Q14 turbulates the flow at a tip P17 where the cut surface CF and the curved line Q14 are coupled, and is one of the causes of deteriorating aerodynamic performance. Therefore, in the case of the embodiment shown in FIG. 10, if the curvature radius R of the virtual ellipse E5 is the same, the curvature of the curved line Q14 forming the fillet portion 13 does not change, and the effect of suppressing the stress concentration for the connection 15 is obtained. However, as described above, there is the disadvantages in terms of aerodynamic performance.

On the other hand, as a means for preventing the deterioration in aerodynamic performance of the blade structure shown in the embodiment of FIG. 10, a blade structure is considered in which the position of the center O5 of the virtual ellipse E5 is lowered downward in the blade height direction. That is, as shown in the mode of FIG. 3, the center O5 of the virtual ellipse E5 can be lowered downward in the blade height direction to a position where the virtual ellipse E5 contacts the end edge 10*a*1 of the platform portion 10 while the virtual ellipse E5 is circumscribed about the position P14 of the airfoil wall surface 8*a* of the airfoil portion 8. As a result, the turbulence of the combustion gas flow at the tip of the cut surface CF of the fillet portion 13 is suppressed, improving the aerodynamic performance of the blade.

As a modified example of the shape of the fillet portion 13 of the central fillet portion 22 on the side of the suction surface 3, an embodiment may be such that the same curvature radius R as the fillet portion 13 of the upstream intermediate fillet portion 24 or the downstream intermediate fillet portion 26 is provided, and as shown in FIG. 3, the position P10 of the lower end of the virtual ellipse E1 is lowered downward in the blade height direction from the position of the upper surface 10*a* of the platform portion 10 to the position where the virtual ellipse E1 contacts the end edge 10*a*1. By lowering the position P10 of the lower end of the virtual ellipse E1 below the position of the upper surface 10*a* of the platform portion 10 in the blade height direction, the effect of reducing the stress concentration is obtained at the same level as the fillet portion 13 of the upstream intermediate fillet portion 24 or the downstream intermediate fillet portion 26, and it is also possible to suppress the deterioration in aerodynamic performance. Further, in the case of the blade structure of the embodiment shown in FIG. 3, as the curvature radius R of the fillet portion 13, the height FH from the lower end P10 of the virtual ellipse E1 at the position G in the blade height direction may be selected instead of the angle θ, the position G on the locus of the virtual ellipse E1 may be decided from the height FH, and the curvature radius R may be selected.

Figure 12A:
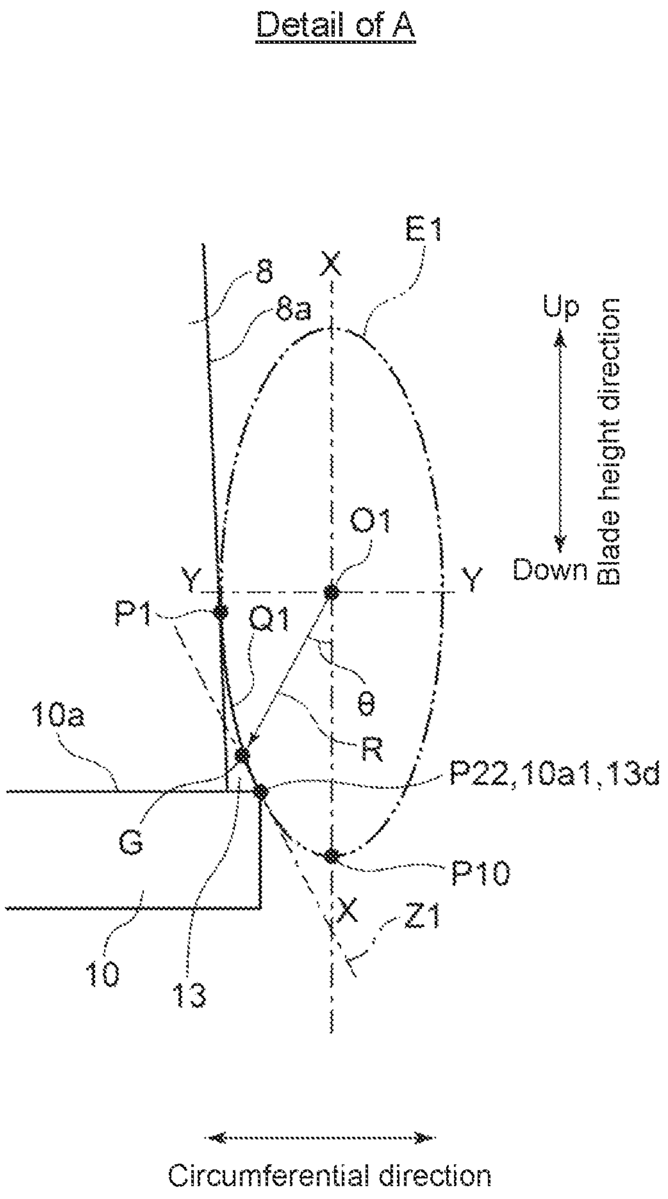
FIG. 12A is a schematic view showing details of a portion A in FIG. 3.
Figure 12B:
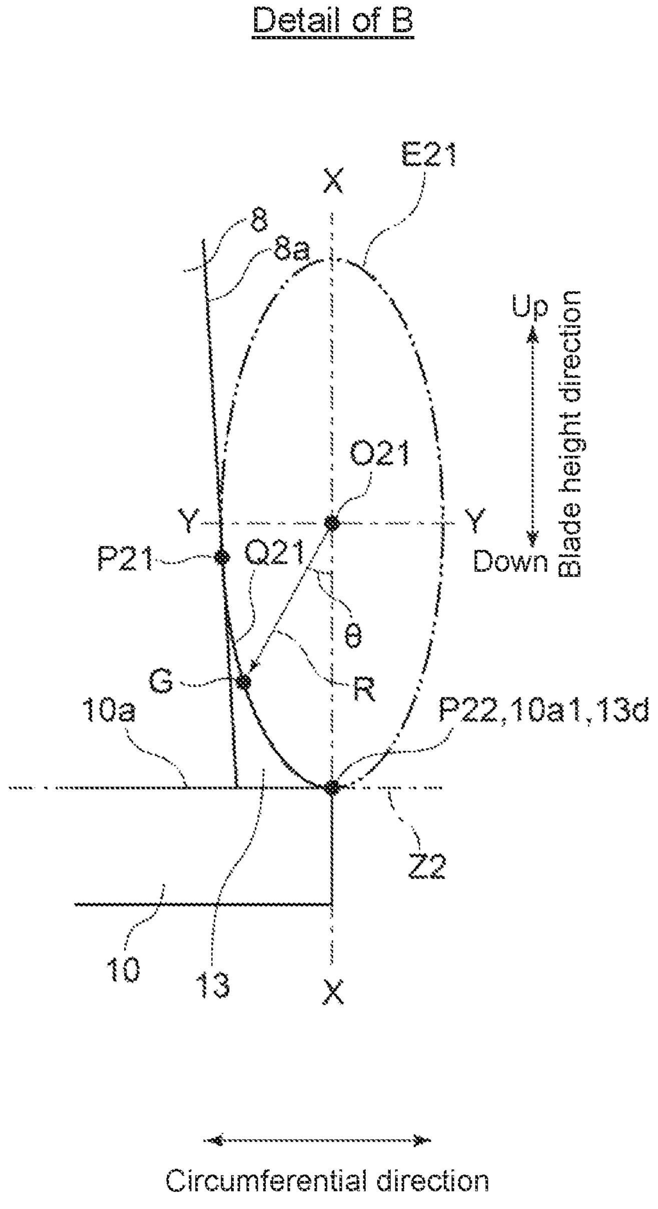
FIG. 12B is a schematic view showing details of a portion B in FIG. 11.

FIGS. 12A and 12B are schematic views showing, in comparison, details of the cross section around the fillet portion 13. FIG. 12A is a schematic view targeted at the embodiment in which the position of the lower end P10 of the virtual ellipse E1 shown in FIG. 3 is lowered downward relative to the upper surface 10*a* of the platform portion 10 in the blade height direction, and showing details of a portion A in FIG. 3. FIG. 12B is a schematic view targeted at the embodiment in which the position of the lower end P22 of the virtual ellipse E21 shown in FIG. 11 is placed on the upper surface 10*a* of the platform portion 10, and showing details of a portion B in FIG. 11.

The fillet portion 13 shown in FIG. 12A is formed such that the virtual ellipse E1 is circumscribed about (tangent to) the airfoil wall surface 8*a* of the airfoil portion 8 at the position P1, and contacts the end edge 10*a*1 of the platform portion 10. That is, if a tangent line Z1 is drawn at the position of the end edge 10*a*1 of the virtual ellipse E1, the tangent line Z1 intersects the upper surface 10*a* of the platform portion 10 with a predetermined inclination without being tangent to the upper surface 10*a* at the end edge 10*a*1 of the upper surface 10*a*. That is, the position of the lower edge 13*d* of the fillet portion 13 having the circumferential width where the fillet portion 13 contacts the upper surface 10*a* of the platform portion 10 coincides with the position of the end edge 10*a*1. The position of the lower end 10 of the virtual ellipse E1 is disposed below the position of the end edge 10*a*1 in the blade height direction. Further, the curved line Q1 forming the outer surface of the fillet portion 13 coincides with a part of the locus of the virtual ellipse E1. Therefore, at the end edge 10*a*1 of the platform portion 10 where the lower edge 13*d* is formed, the curved line Q1 which is the curved surface or the curved line forming the outer surface of the fillet portion 13 intersects the upper surface 10*a* of the platform portion 10 with the predetermined inclination without being tangent to the upper surface 10*a* at the end edge 10*a*1 of the upper surface 10*a*. The predetermined inclination is an inclination angle with respect to the upper surface 10*a* when the tangent line Z1 intersects the upper surface 10*a* at the end edge 10*a*1, and can be selected by the elliptical ratio (H/D).

On the other hand, the fillet portion 13 shown in FIG. 12B in contrast to FIG. 12A is formed such that the virtual ellipse E21 is circumscribed about (tangent to) the airfoil wall surface 8*a* of the airfoil portion 8 at the position P21, and the lower end P22 contacts the end edge 10*a*1 of the platform portion 10. That is, if a tangent line Z2 is drawn at the position of the end edge 10*a*1 of the virtual ellipse E21, the tangent line Z2 is a line segment that coincides with the upper surface 10*a* of the platform portion 10 and is formed in parallel to the upper surface 10*a*. That is, the curved line Q21 which is the curved surface or the curved line forming the outer surface of the fillet portion 13 is tangent to the upper surface 10*a* of the platform portion 10 at the end edge 10*a*1 of the platform portion 10 where the lower edge 13*d* of the fillet portion 13 is formed. In the fillet portion 13 forming the upstream intermediate fillet portion 24 and the downstream intermediate fillet portion 26, the lower edge 13*d* of the curved surface forming the outer surface of the fillet portion 13 is tangent to the upper surface 10*a* of the platform portion 10 at the end edge 10*a*1 of the platform portion 10. The embodiment shown in FIG. 12B shows the example in which the lower end P22 of the virtual ellipse E21 coincides with the end edge 10*a*1 of the platform portion 10. However, even if the center O21 of the virtual ellipse E21 gets closer to the airfoil portion 8 than the end edge 10*a*1, the lower edge 13*d* of the fillet portion 13 is tangent to the upper surface 10*a* of the platform portion 10 with a smooth surface.

Assuming that the virtual ellipse E1, E21 is circumscribed about the airfoil wall surface 8*a* of the airfoil portion 8 and contacts the upper surface 10*a* of the platform portion 10, depending on whether the position of the center O1, O21 of the virtual ellipse E1, E21 is disposed closer to the side of the airfoil portion 8 than the position of the end edge 10*a*1 or disposed separately from the airfoil portion 8 in the circumferential direction, the inclination of the curved surface at the lower edge 13*d* of the fillet portion 13 that contacts the upper surface 10*a* of the platform portion 10 changes. If the position of the center O1 of the virtual ellipse E1 is separated from the airfoil portion 8 relative to the end edge 10*a*1 in the circumferential direction as in the virtual ellipse E1, the position of the lower end P10 of the virtual ellipse E1 exists below the upper surface 10*a* of the platform portion 10 in the blade height direction. Therefore, the curved surface of the fillet portion 13 at the lower edge 13*d* of the fillet portion 13 intersects the upper surface 10*a* of the platform portion 10 with the predetermined inclination without being tangent to the upper surface 10*a*1, and forms a downward curved surface in the blade height direction. On the other hand, if the position of the center O1 of the virtual ellipse E21 is close to the end edge 10*a*1 or the side of the airfoil portion 8 relative to the end edge 10*a*1 in the circumferential direction as in the virtual ellipse E21, the curved surface of the fillet portion 13 at the lower edge 13*d* of the fillet portion 13 is tangent to the upper surface 10*a*1 of the platform portion 10 with a smooth surface.

The curved line Q21 deciding the cross-sectional shape of the fillet portion 13 shown in the embodiment of FIG. 11 forms a curved line concaved in a center direction of the airfoil portion 8, suppressing the turbulence of the combustion gas flow. In a case of a fillet shape protruding convexedly in the opposite direction, the turbulence of the combustion gas flow occurs in the convex portion, which is advantageous in terms of suppressing the stress concentration, but is disadvantageous in terms of aerodynamic performance.

As described above, in the case of the large long blade shown in some embodiments, since the space for disposing the fillet is limited in the central region (central fillet portion 22) on the side of the suction surface 3 depending on the blade structure, it is desirable to select the fillet shape from the both aspects of the reduction in stress concentration and the improvement in aerodynamic performance.

The present disclosure is not limited to the above-described embodiments, and also includes an embodiment obtained by modifying the above-described embodiments and an embodiment obtained by combining these embodiments as appropriate.

For example, the cross section of the central fillet portion 22 is not limited to the configuration illustrated in FIG. 3, but may be the configuration shown in FIG. 9, and it may be configured such that the center of the virtual ellipse defining the curved line Q1 is located between the suction surface 3 and the end edge 10*a*1 of the upper surface 10*a* of the platform portion 10.

The contents described in the above embodiments would be understood as follows, for instance.

(1) A turbine rotor blade (such as the above-described turbine rotor blade 2) according to the present disclosure includes an airfoil portion having a pressure surface (such as the above-described pressure surface 4) and a suction surface (such as the above-described suction surface 3), a platform portion (such as the above-described platform portion 10) formed on a base end side of the airfoil portion (such as the above-described airfoil portion 8), a shank portion (such as the above-described shank portion 12) formed opposite to the airfoil portion across the platform portion, and a suction side fillet portion (such as the above-described suction side fillet portion 16) formed in a connection (such as the above-described connection 15) between the suction surface and an upper surface (such as the above-described upper surface 10*a*) of the platform portion. The suction side fillet portion includes a central fillet portion (such as the above-described central fillet portion 22) which is formed at a position including a center of a length of the suction side fillet portion along an extension direction of the suction side fillet portion, an upstream intermediate fillet portion (such as the above-described upstream intermediate fillet portion 24) which is located between the central fillet portion and a front edge (such as the above-described front edge 16*a*) that is an upstream end of the suction side fillet portion, and in which a fillet height (such as the above-described fillet height h2) from the upper surface of the platform portion is higher than the fillet height of the central fillet portion, and a downstream intermediate fillet portion (such as the above-described downstream intermediate fillet portion 26) which is located between the central fillet portion and a rear edge (such as the above-described rear edge 16*b*) that is a downstream end of the suction side fillet portion, and in which a fillet height (such as the above-described fillet height h3) from the upper surface of the platform portion is higher than the fillet height of the central fillet portion.

With the turbine rotor blade defined in the above configuration (1), since, in the suction side fillet portion, the fillet heights in the upstream intermediate fillet portion and the downstream intermediate fillet portion where the stress is likely to be high is higher than the fillet height in the intermediate fillet portion where the stress is unlikely to be high, it is possible to suppress the stress concentration. Thus, it is possible to improve the life of the turbine rotor blade due to bending creep. Further, as compared with the case where the fillet height is uniformly increased from the front edge to the rear edge of the suction side fillet portion, it is possible to suppress the deterioration in aerodynamic performance.

(2) In some embodiments, in the turbine rotor blade defined in the above configuration (1), each of the central fillet portion, the upstream intermediate fillet portion, and the downstream intermediate fillet portion has a cross section (such as the above-described cross section S1, S1, S3) demarcated by: a curved line (such as the above-described curved line Q1, Q4, Q7) connecting the suction surface and the upper surface of the platform portion, the curved line being defined by a part of an ellipse (such as the above-described ellipse E1, E2, E3); a first line segment (such as the above-described line segment Q2, Q5, Q8) extending from a position where the curved line is connected to the suction surface to the upper surface of the platform portion along a blade height direction; and a second line segment (such as the above-described line segment Q3, Q6, Q9) extending from a position where the first line segment is connected to the upper surface of the platform portion to a position where the curved line is connected to the upper surface, a curvature radius of the ellipse defining the curved line in the upstream intermediate fillet portion is larger than a curvature radius of the ellipse defining the curved line in the central fillet portion, when compared at a same blade-height-directional position, and a curvature radius of the ellipse defining the curved line in the downstream intermediate fillet portion is larger than the curvature radius of the ellipse defining the curved line in the central fillet portion, when compared at the same blade-height-directional position.

With the turbine rotor blade defined in the above configuration (2), since, in the cross section of the suction side fillet portion, the curvature radius of the ellipse defining the above-described curved line of the upstream intermediate fillet portion and the downstream intermediate fillet portion where the stress is likely to be high is made greater than the curvature radius of the ellipse defining the above-described curved line of the central fillet portion where the stress is unlikely to be high, it is possible to suppress the stress concentration.

(3) In some embodiments, in the turbine rotor blade defined in the above configuration (1) or (2), a ratio (such as the above-described ratio h2/d2) of the fillet height to a fillet width in the upstream intermediate fillet portion is lower than a ratio (such as the above-described ratio h1/d1) of the fillet height to a fillet width in the central fillet portion, and a ratio (such as the above-described ratio h3/d3) of the fillet height to a fillet width in the downstream intermediate fillet portion is lower than the ratio of the fillet height to the fillet width in the central fillet portion.

With the turbine rotor blade defined in the above configuration (3), since, in the upstream intermediate fillet portion and the downstream intermediate fillet portion where it is relatively easy to secure the fillet width on the upper surface of the platform portion, the ratio of the fillet height to the fillet width is lower than in the central fillet portion where it is difficult to secure the fillet width, it is possible to suppress the deterioration in aerodynamic performance while suppressing the stress concentration.

(4) In some embodiments, in the turbine rotor blade defined in any one of the above configurations (1) to (3), the suction side fillet portion includes a front edge fillet portion (such as the above-described front edge fillet portion 28) adjacent to an upstream side of the upstream intermediate fillet portion, and the fillet height in the upstream intermediate fillet portion is higher than a fillet height (such as the above-described fillet height h4) in the front edge fillet portion.

With the turbine rotor blade defined in the above configuration (4), it possible to suppress the stress concentration in the upstream intermediate fillet portion where the stress is likely to be higher than in the front edge fillet portion. Further, as compared with the case where the fillet height is uniformly increased from the front edge to the rear edge of the suction side fillet portion, it is possible to suppress the deterioration in aerodynamic performance.

(5) In some embodiments, in the turbine rotor blade defined in any one of the above configurations (1) to (4), the suction side fillet portion includes a rear edge fillet portion (such as the above-described rear edge fillet portion 30) adjacent to a downstream side of the downstream intermediate fillet portion, and the fillet height in the downstream intermediate fillet portion is higher than a fillet height (such as the above-described fillet height h5) in the rear edge fillet portion.

With the turbine rotor blade defined in the above configuration (5), it possible to suppress the stress concentration in the downstream intermediate fillet portion where the stress is likely to be higher than in the rear edge fillet portion. Further, as compared with the case where the fillet height is uniformly increased from the front edge to the rear edge of the suction side fillet portion, it is possible to suppress the deterioration in aerodynamic performance.

(6) In some embodiments, in the turbine rotor blade defined in any one of the above configurations (1) to (5), the turbine rotor blade further includes a pressure side fillet portion (such as the above-described pressure side fillet portion 20) formed in a connection (such as the above-described connection 18) between the pressure surface and the upper surface of the platform portion, the pressure side fillet portion includes a central fillet portion (such as the above-described central fillet portion 32) which is formed at a position including a center of a length of the suction side fillet portion along an extension direction of the pressure side fillet portion, and a fillet height (such as the above-described fillet height h6) of the central fillet portion in the pressure side fillet portion is higher than the fillet height of the central fillet portion in the suction side fillet portion.

With the turbine rotor blade defined in the above configuration (7), it possible to suppress the stress concentration in the central fillet portion where the stress is likely to be higher than in the central fillet portion of the suction side fillet portion. Further, as compared with the case where the fillet height of the central fillet portion in the suction side fillet portion and the fillet height of the central fillet portion in the pressure side fillet portion are uniformly increased, it is possible to suppress the deterioration in aerodynamic performance.

(8) In some embodiments, in the turbine rotor blade defined in the above configuration (7), a boundary line (such as the above-described boundary line L1) between the suction surface and the upper surface of the platform portion includes two suction side sections (such as the above-described suction side sections T1, T2) overlapping the shank portion as viewed in the blade height direction, a boundary line (such as the above-described boundary line L2) between the pressure surface and the upper surface of the platform portion includes one pressure side section (such as the above-described pressure side section T3) overlapping the shank portion as viewed in the blade height direction, the upstream intermediate fillet portion is formed along at least a part of one of the two suction side sections, the downstream intermediate fillet portion is formed along at least a part of the other of the two suction side sections, and the central fillet portion of the pressure side fillet portion is formed along at least a part of the one pressure side section.

With the turbine rotor blade defined in the above configuration (8), it is possible to suppress the stress concentration by increasing the fillet height in the section where the stress is likely to be high.

(9) In some embodiments, in the turbine rotor blade defined in the above configuration (7), the central fillet portion of the suction side fillet portion is formed along at least a part of a section (such as the above-described suction side section T4) interposed between the two suction side sections of a boundary line between the suction surface and the upper surface of the platform portion.

With the turbine rotor blade defined in the above configuration (8), it is possible to suppress the deterioration in aerodynamic performance by decreasing the fillet height in the section where the stress is less generated.

(9) In some embodiments, in the turbine rotor blade defined in any one of the above configurations (1) to (8), the central fillet portion of the suction side fillet portion has a cross section demarcated by: a curved line connecting the suction surface and an end edge of the upper surface of the platform portion, a first line segment extending from a position where the curved line is connected to the suction surface to the upper surface of the platform portion along a blade height direction; and a second line segment extending from a position where the first line segment is connected to the upper surface of the platform portion to the end edge, the curved line is defined by a part of an ellipse, a center of the ellipse is located opposite to the airfoil portion across the end edge of the platform portion in a blade thickness direction, and a position of a lower end of the ellipse is located below the end edge of the platform portion in the blade height direction.

With the turbine rotor blade defined in the above configuration (9), as compared with the case where the lower end of the relatively small ellipse defining the above-described curved line is located at the position of the end edge of the platform portion (see FIG. 9), it is possible to suppress the stress concentration. Further, as compared with the case where the central fillet portion is formed (the case where the fillet cut surface is formed by aligning the position of the lower end of the ellipse with the position of the upper surface of the platform portion in the blade height direction) as shown in FIG. 10, it is advantageous in terms of aerodynamic performance.

(10) A turbine rotor blade according to the present disclosure includes an airfoil portion having a pressure surface and a suction surface, a platform portion formed on a base end side of the airfoil portion, a shank portion formed opposite to the airfoil portion across the platform portion, and a suction side fillet portion formed in a connection between the suction surface and an upper surface of the platform portion. The suction side fillet portion includes a central fillet portion which is formed at a position including a center of the suction side fillet portion. The central fillet portion has across section demarcated by: a curved line connecting the suction surface and an end edge of the upper surface of the platform portion; a first line segment extending from a position where the curved line is connected to the suction surface to the upper surface of the platform portion along a blade height direction; and a line segment extending from a position where the first line segment is connected to the upper surface of the platform portion to the end edge. The curved line is defined by apart of an ellipse. A center of the ellipse is located opposite to the airfoil portion across the end edge of the platform portion in a blade thickness direction. A position of a lower end of the ellipse is located below the end edge of the platform portion in the blade height direction.

With the turbine rotor blade defined in the above configuration (10), as compared with the case where the lower end of the relatively small ellipse defining the above-described curved line is located at the position of the end edge of the platform portion (see FIG. 9), it is possible to suppress the stress concentration. Further, as compared with the case where the central fillet portion is formed (the case where the fillet cut surface is formed by aligning the position of the lower end of the ellipse with the position of the upper surface of the platform portion in the blade height direction) as shown in FIG. 10, it is advantageous in terms of aerodynamic performance.

(11) A turbine rotor blade according to the present disclosure includes an airfoil portion having a pressure surface and a suction surface, a platform portion formed on a base end side of the airfoil portion, a shank portion formed opposite to the airfoil portion across the platform portion, and a suction side fillet portion formed in a connection between the suction surface and an upper surface of the platform portion. The suction side fillet portion includes a central fillet portion located at a center of the suction side fillet portion. In the fillet portion forming the central fillet portion, a lower edge of a curved surface forming an outer surface of the fillet portion intersects the upper surface of the platform portion with a predetermined inclination without being tangent to the upper surface of the platform portion at an end edge of the platform portion.

With the turbine rotor blade defined in the above configuration (11), it is possible to prevent the deterioration in aerodynamic performance while suppressing the stress concentration in the fillet portion.

REFERENCE SIGNS LIST

1 Gas turbine
2 Turbine rotor blade
3 Suction surface
4 Pressure surface
5 Blade leading edge
6 Blade trailing edge
8 Airfoil portion
8 Airfoil wall surface
10 Platform portion
10*a* Upper surface
10*a*1 End edge
12 Shank portion
13 Fillet portion
13*a* Front edge
13*b* Rear edge
13*c* Upper edge
13*d* Lower edge
14 Blade root portion
15 Connection
16 Suction side fillet portion
18 Connection
19 Corner (edge)
20 Pressure side fillet portion
22 Central fillet portion
24 Upstream intermediate fillet portion
26 Downstream intermediate fillet portion
28 Front edge fillet portion
28*a* Suction side front edge fillet portion
28*b* Pressure side front edge fillet portion
30 Rear edge fillet portion
30*a* Suction side rear edge fillet portion
30*b* Pressure side rear edge fillet portion
32 Central fillet portion
Q1, Q4, Q7, Q11, Q14, Q21 Curved line
Q2, Q5, Q8, Q12, Q15, Q22 First line segment
Q3, Q6, Q9, Q13, Q16, Q23 Second line segment

The invention claimed is:

1. A turbine rotor blade, comprising:
an airfoil portion having a pressure surface and a suction surface;
a platform portion formed on a base end side of the airfoil portion;
a shank portion formed opposite to the airfoil portion across the platform portion; and
at least a suction side fillet portion of a fillet portion formed in a connection between the suction surface and an upper surface of the platform portion,
wherein the suction side fillet portion includes:
a central fillet portion which is formed at a position including a center of a length of the suction side fillet portion along an extension direction of the suction side fillet portion;
an upstream intermediate fillet portion which is located between the central fillet portion and a front edge that is an upstream end of the suction side fillet portion, and in which a fillet height of the upstream intermediate fillet portion from the upper surface of the platform portion is higher than a fillet height of the central fillet portion; and
a downstream intermediate fillet portion which is located between the central fillet portion and a rear edge that is a downstream end of the suction side fillet portion, and in which a fillet height of the downstream intermediate fillet portion from the upper surface of the platform portion is higher than the fillet height of the central fillet portion,
wherein a ratio of the fillet height to a fillet width in the upstream intermediate fillet portion is lower than a ratio of the fillet height to a fillet width in the central fillet portion, and
wherein a ratio of the fillet height to a fillet width in the downstream intermediate fillet portion is lower than the ratio of the fillet height to the fillet width in the central fillet portion.

2. The turbine rotor blade according to claim 1,
wherein each of the central fillet portion, the upstream intermediate fillet portion, and the downstream intermediate fillet portion has a cross section demarcated by:
a curved line connecting the suction surface and the upper surface of the platform portion, the curved line being defined by a part of an ellipse;
a first line segment extending from a position where the curved line is connected to the suction surface to the upper surface of the platform portion along a blade height direction; and
a second line segment extending from a position where the first line segment is connected to the upper surface of the platform portion to a position where the curved line is connected to the upper surface,
wherein a curvature radius of the ellipse defining the curved line in the upstream intermediate fillet portion is larger than a curvature radius of the ellipse defining the curved line in the central fillet portion, when compared at a same blade-height-directional position, and
wherein a curvature radius of the ellipse defining the curved line in the downstream intermediate fillet portion is larger than the curvature radius of the ellipse defining the curved line in the central fillet portion, when compared at the same blade-height-directional position.

3. The turbine rotor blade according to claim 1,
wherein the suction side fillet portion includes a front edge fillet portion adjacent to an upstream side of the upstream intermediate fillet portion, and
wherein the fillet height in the upstream intermediate fillet portion is higher than a fillet height in the front edge fillet portion.

4. The turbine rotor blade according to claim 1,
wherein the suction side fillet portion includes a rear edge fillet portion adjacent to a downstream side of the downstream intermediate fillet portion, and wherein the fillet height in the downstream intermediate fillet portion is higher than a fillet height in the rear edge fillet portion.

5. The turbine rotor blade according to claim 1, further comprising a pressure side fillet portion formed in a connection between the pressure surface and the upper surface of the platform portion, wherein the pressure side fillet portion includes a central fillet portion which is formed at a position including a center of a length of the pressure side fillet portion along an extension direction of the pressure side fillet portion, and wherein a fillet height of the central fillet portion in the pressure side fillet portion is higher than the fillet height of the central fillet portion in the suction side fillet portion.

6. The turbine rotor blade according to claim 1, wherein the turbine rotor blade further comprises a pressure side fillet portion formed in a connection between the pressure surface and the upper surface of the platform portion, wherein a central fillet portion which is formed at a position including a center of a length of the pressure side fillet portion along an extension direction of the pressure side fillet portion, wherein a fillet height of the central fillet portion in the pressure side fillet portion is higher than the fillet height of the central fillet portion in the suction side fillet portion, wherein a boundary line between the suction surface and the upper surface of the platform portion includes two suction side sections overlapping the shank portion as viewed in a blade height direction, wherein a boundary line between the pressure surface and the upper surface of the platform portion includes one pressure side section overlapping the shank portion as viewed in the blade height direction, wherein the upstream intermediate fillet portion is formed along at least a part of one of the two suction side sections, wherein the downstream intermediate fillet portion is formed along at least a part of the other of the two suction side sections, and wherein the central fillet portion of the pressure side fillet portion is formed along at least a part of the one pressure side section.

7. The turbine rotor blade according to claim 6, wherein the central fillet portion of the suction side fillet portion is formed along at least a part of a section interposed between the two suction side sections of the boundary line between the suction surface and the upper surface of the platform portion.

8. A turbine rotor blade, comprising:

an airfoil portion having a pressure surface and a suction surface;

a platform portion formed on a base end side of the airfoil portion;

a shank portion formed opposite to the airfoil portion across the platform portion; and at least a suction side fillet portion of a fillet portion formed in a connection between the suction surface and an upper surface of the platform portion, wherein the suction side fillet portion includes:

a central fillet portion which is formed at a position including a center of a length of the suction side fillet portion along an extension direction of the suction side fillet portion;

an upstream intermediate fillet portion which is located between the central fillet portion and a front edge that is an upstream end of the suction side fillet portion, and in which a fillet height of the upstream intermediate fillet portion from the upper surface of the platform portion is higher than a fillet height of the central fillet portion; and a downstream intermediate fillet portion which is located between the central fillet portion and a rear edge that is a downstream end of the suction side fillet portion, and in which a fillet height of the downstream intermediate fillet portion from the upper surface of the platform portion is higher than the fillet height of the central fillet portion, wherein the central fillet portion of the suction side fillet portion has a first cross section demarcated by:

a first curved line connecting the suction surface and an end edge of the upper surface of the platform portion;

a first line segment extending from a position where the first curved line is connected to the suction surface to the upper surface of the platform portion along a blade height direction; and a second line segment extending from a position where the first line segment is connected to the upper surface of the platform portion to the end edge, wherein the first curved line is defined by a part of an ellipse, wherein a center of the ellipse is located opposite to the airfoil portion across the end edge of the platform portion in a blade thickness direction, and wherein a position of a lower end of the ellipse is located below the end edge of the platform portion in the blade height direction.

9. The turbine rotor blade according to claim 8, wherein, the upstream intermediate fillet portion has a second cross section demarcated by:

a second curved line connecting the suction surface and the upper surface of the platform portion, the second curved line being defined by a part of an ellipse;

a third line segment extending from a position where the second curved line is connected to the suction surface to the upper surface of the platform portion along a blade height direction; and a fourth line segment extending from a position where the third line segment is connected to the upper surface of the platform portion to a position where the second curved line is connected to the upper surface, wherein the downstream intermediate fillet portion has a third cross section demarcated by:

a third curved line connecting the suction surface and the upper surface of the platform portion, the third curved line being defined by a part of an ellipse;

a fifth line segment extending from a position where the third curved line is connected to the suction surface to the upper surface of the platform portion along a blade height direction; and a sixth line segment extending from a position where the fifth line segment is connected to the upper surface of the platform portion to a position where the third curved line is connected to the upper surface, wherein a curvature radius of the ellipse defining the second curved line in the upstream intermediate fillet portion is larger than a curvature radius of the ellipse defining the first curved line in the central fillet portion, when compared at a same blade-height-directional position, and wherein a curvature radius of the ellipse defining the third curved line in the downstream intermediate fillet portion is larger than the curvature radius of the ellipse defining the first curved line in the central fillet portion, when compared at the same blade-height-directional position.

10. The turbine rotor blade according to claim 8, wherein the suction side fillet portion includes a front edge fillet portion adjacent to an upstream side of the upstream intermediate fillet portion, and wherein the fillet height in the upstream intermediate fillet portion is higher than a fillet height in the front edge fillet portion.

11. The turbine rotor blade according to claim 8, wherein the suction side fillet portion includes a rear edge fillet portion adjacent to a downstream side of the downstream intermediate fillet portion, and wherein the fillet height in the downstream intermediate fillet portion is higher than a fillet height in the rear edge fillet portion.

12. The turbine rotor blade according to claim 8, further comprising a pressure side fillet portion formed in a connection between the pressure surface and the upper surface of the platform portion, wherein the pressure side fillet portion includes a central fillet portion which is formed at a position including a center of a length of the pressure side fillet portion along an extension direction of the pressure side fillet portion, and wherein a fillet height of the central fillet portion in the pressure side fillet portion is higher than the fillet height of the central fillet portion in the suction side fillet portion.

13. The turbine rotor blade according to claim 8, wherein the turbine rotor blade further comprises a pressure side fillet portion formed in a connection between the pressure surface and the upper surface of the platform portion, wherein a central fillet portion which is formed at a position including a center of a length of the pressure side fillet portion along an extension direction of the pressure side fillet portion, wherein a fillet height of the central fillet portion in the pressure side fillet portion is higher than the fillet height of the central fillet portion in the suction side fillet portion, wherein a boundary line between the suction surface and the upper surface of the platform portion includes two suction side sections overlapping the shank portion as viewed in the blade height direction, wherein a boundary line between the pressure surface and the upper surface of the platform portion includes one pressure side section overlapping the shank portion as viewed in the blade height direction, wherein the upstream intermediate fillet portion is formed along at least a part of one of the two suction side sections, wherein the downstream intermediate fillet portion is formed along at least a part of the other of the two suction side sections, and wherein the central fillet portion of the pressure side fillet portion is formed along at least a part of the one pressure side section.

14. The turbine rotor blade according to claim 13, wherein the central fillet portion of the suction side fillet portion is formed along at least a part of a section interposed between the two suction side sections of the boundary line between the suction surface and the upper surface of the platform portion.

15. A turbine rotor blade, comprising:

an airfoil portion having a pressure surface and a suction surface;

a platform portion formed on a base end side of the airfoil portion;

a shank portion formed opposite to the airfoil portion across the platform portion; and at least a suction side fillet portion of a fillet portion formed in a connection between the suction surface and an upper surface of the platform portion, wherein the suction side fillet portion includes:

a central fillet portion which is formed at a position including a center of a length of the suction side fillet portion along an extension direction of the suction side fillet portion;

an upstream intermediate fillet portion which is located between the central fillet portion and a front edge that is an upstream end of the suction side fillet portion, and in which a fillet height of the upstream intermediate fillet portion from the upper surface of the platform portion is higher than a fillet height of the central fillet portion; and a downstream intermediate fillet portion which is located between the central fillet portion and a rear edge that is a downstream end of the suction side fillet portion, and in which a fillet height of the downstream intermediate fillet portion from the upper surface of the platform portion is higher than the fillet height of the central fillet portion, wherein, in the central fillet portion, a lower edge of a curved surface forming an outer surface of the central fillet portion intersects the upper surface of the platform portion with a predetermined inclination without being tangent to the upper surface of the platform portion at an end edge of the platform portion, and wherein, in the upstream intermediate fillet portion and the downstream intermediate fillet portion, a lower edge of a curved surface forming an outer surface of each of the upstream intermediate fillet portion and the downstream intermediate fillet portion is tangent to the upper surface of the platform portion.

16. The turbine rotor blade according to claim 15, wherein each of the central fillet portion, the upstream intermediate fillet portion, and the downstream intermediate fillet portion has a cross section demarcated by:

a curved line connecting the suction surface and the upper surface of the platform portion, the curved line being defined by a part of an ellipse;

a first line segment extending from a position where the curved line is connected to the suction surface to the upper surface of the platform portion along a blade height direction; and a second line segment extending from a position where the first line segment is connected to the upper surface of the platform portion to a position where the curved line is connected to the upper surface, wherein a curvature radius of the ellipse defining the curved line in the upstream intermediate fillet portion is larger than a curvature radius of the ellipse defining the curved line in the central fillet portion, when compared at a same blade-height-directional position, and wherein a curvature radius of the ellipse defining the curved line in the downstream intermediate fillet portion is larger than the curvature radius of the ellipse defining the curved line in the central fillet portion, when compared at the same blade-height-directional position.

17. The turbine rotor blade according to claim 15, wherein the suction side fillet portion includes a front edge fillet portion adjacent to an upstream side of the upstream intermediate fillet portion, and wherein the fillet height in the upstream intermediate fillet portion is higher than a fillet height in the front edge fillet portion.

18. The turbine rotor blade according to claim 15, wherein the suction side fillet portion includes a rear edge fillet portion adjacent to a downstream side of the downstream intermediate fillet portion, and wherein the fillet height in the downstream intermediate fillet portion is higher than a fillet height in the rear edge fillet portion.

19. The turbine rotor blade according to claim 15, further comprising a pressure side fillet portion formed in a connection between the pressure surface and the upper surface of the platform portion, wherein the pressure side fillet portion includes a central fillet portion which is formed at a position including a center of a length of the pressure side fillet portion along an extension direction of the pressure side fillet portion, and wherein a fillet height of the central fillet portion in the pressure side fillet portion is higher than the fillet height of the central fillet portion in the suction side fillet portion.

20. The turbine rotor blade according to claim 15, wherein the turbine rotor blade further comprises a pressure side fillet portion formed in a connection between the pressure surface and the upper surface of the platform portion, wherein a central fillet portion which is formed at a position including a center of a length of the pressure side fillet portion along an extension direction of the pressure side fillet portion, wherein a fillet height of the central fillet portion in the pressure side fillet portion is higher than the fillet height of the central fillet portion in the suction side fillet portion, wherein a boundary line between the suction surface and the upper surface of the platform portion includes two suction side sections overlapping the shank portion as viewed in a blade height direction, wherein a boundary line between the pressure surface and the upper surface of the platform portion includes one pressure side section overlapping the shank portion as viewed in the blade height direction, wherein the upstream intermediate fillet portion is formed along at least a part of one of the two suction side sections, wherein the downstream intermediate fillet portion is formed along at least a part of the other of the two suction side sections, and wherein the central fillet portion of the pressure side fillet portion is formed along at least a part of the one pressure side section.

21. The turbine rotor blade according to claim 20, wherein the central fillet portion of the suction side fillet portion is formed along at least a part of a section interposed between the two suction side sections of the boundary line between the suction surface and the upper surface of the platform portion.

* * * * *